United States Patent [19]

Jones et al.

[11] Patent Number: 5,771,381
[45] Date of Patent: Jun. 23, 1998

[54] METHOD AND SYSTEM FOR ADDING CONFIGURATION FILES FOR A USER

[75] Inventors: Gregory A. Jones, Seattle; David R. Dickman, Redmond, both of Wash.

[73] Assignee: Microsoft Corporation, Redmond, Wash.

[21] Appl. No.: 864,492

[22] Filed: May 28, 1997

Related U.S. Application Data

[63] Continuation of Ser. No. 355,999, Dec. 13, 1994, abandoned.

[51] Int. Cl.$^6$ .......................................................... G06F 9/45
[52] U.S. Cl. ................................................................. 395/653
[58] Field of Search ....................................... 395/652, 653

[56] References Cited

U.S. PATENT DOCUMENTS

| | | | |
|---|---|---|---|
| 5,247,683 | 9/1993 | Holmes et al. | 395/700 |
| 5,381,534 | 1/1995 | Shi | 395/700 |
| 5,473,772 | 12/1995 | Halliwell et al. | 395/650 |
| 5,485,370 | 1/1996 | Moss et al. | 364/408 |

OTHER PUBLICATIONS

Dialog File 470:Books In Print, (c) 1997 R.R.Bowker, Reed Elsevier Inc., Title: Microsoft Windows NT Resource Guide, ISBN: 1–55615–598–0 (1993/06), Status: Out of Print, Publisher: Microsoft, vol. 1, pp. 281–323 and 325–562, Aug. 1993.

Microsoft Press, "Windows NT™ Resource Guide," vol. 1, pp. 281–323, 325–562, 1985.

*Primary Examiner*—Emanuel Todd Voeltz
*Assistant Examiner*—Peter J. Corcoran, III
*Attorney, Agent, or Firm*—Seed and Berry LLP

[57] ABSTRACT

A method and system for adding configuration files for a user. The method receives an identification of the user. Then, the method locates user profile information which identifies configuration files, a source folder that contains the configuration files, and a destination folder in which to copy the configuration files. For each identified configuration file, the method copies the configuration file to the appropriate folder or deletes the configuration file from the appropriate folder. The method also stores location information identifying the location of the destination folder. Then a computer program can retrieve the location information and can access the configuration files in the destination folder during configuration of the computer program.

30 Claims, 17 Drawing Sheets

5,771,381

METHOD AND SYSTEM FOR ADDING CONFIGURATION FILES FOR A USER

CROSS-REFERENCE TO RELATED APPLICATION

This application is a continuation of U.S. patent application Ser. No. 08/355,999, filed Dec. 13, 1994, now abandoned.

TECHNICAL FIELD

This invention relates generally to a method for adding configuration files to a computer system, and more specifically, for adding additional configuration files for a user.

BACKGROUND OF THE INVENTION

A computer system may be configured to conform to a user's preferences. The configuration of a computer system affects the way it appears to a user. Generally, a computer system provides a default system configuration file, which is used for each user. The system configuration file includes information such as color preferences for the display screen, the size and placement of windows, and font types for text. In some multi-user systems, a system configuration file is maintained for each user. Users may modify their configuration file to customize their configuration.

In order to use a multi-user computer system, a user logs on to the computer system. The computer system typically requests identification from the user, which enables the computer system to verify that the user is an authorized user of the computer system. When a user logs on to the computer system, the user becomes the current user. The computer system uses the identification of the user to retrieve the system configuration file for that user. The computer system is then configured based on the information in the retrieved configuration file.

Computer systems generally retrieve the system configuration files from a file storage area. Typically, a computer system uses a file storage area, that is organized as a directory hierarchy, to store files. FIG. 1 illustrates a sample conventional directory hierarchy. A directory hierarchy generally contains sets of folders and files. A folder contained in another folder is a subfolder. A folder may contain either another folder or a file. In FIG. 1, the folder "Windows" 102 contains the folder "Users" 104. The folder "Users" contains the folders "John Smith" 106 and "Mary Richards" 108. The folder "John Smith" contains a file "SysConfig.dat" 110, and the folder "Mary Richards" also contains a file "SysConfig.dat" 116. The files named "SysConfig.dat" are system configuration files. A path name to a file or folder is the listing of the folders that lead to the desired file or folder. For example, the path name to the file "SysConfig.dat" in the folder "Mary Richards" is "Windows\Users\MaryRichards\SysConfig.dat." In some multi-user computer systems, the system configuration files for each user are stored in a folder associated with the user. For example, the directory hierarchy may contain a folder for each user, such as the folders "John Smith" 106 and "Mary Richards" 108. These folders may contain a system configuration file, such as "SysConfig.dat" 110 or "SysConfig.dat" 116, for each user.

Some multi-user computer systems are a network of computer systems. Such a network of computer systems generally has a central file storage area and, for each computer system in the network, a local file storage area. The central file storage area and the local file storage area are typically organized as directory hierarchies. The folders in the central file storage area are referred to as central folders, and the folders in a local file storage area are referred to as local folders. Similarly, each computer system in the network is a local computer system, and the computer system that contains the central file storage area (e.g., a file server) is the central computer system.

The system configuration file for each user of a computer network system is typically stored in a central folder. When a user logs on through a local computer system, the local computer system uses the log on identification to locate the system configuration file for the user in the central folder. The located system configuration file is copied to a local folder of the local computer system through which the user logs on. The local computer system then uses the system configuration file in its local folder.

Some conventional computer systems store configuration information in a hierarchical database (i.e., a registry), rather than in configuration files. Such a registry has a root node that contains other nodes. Each node can contain other nodes and data entries. The data entries contain the data of the registry. Each data entry comprises a data entry name and data entry value. Each node also has a name. (This organization is analogous to a directory hierarchy in which folders can contain other folders or files.) FIG. 2 illustrates a sample portion of a registry. The node 201 is the root node and is identified by the name "ROOT." The ROOT node contains two nodes: node 202 identified by the name "ALL_USERS" and node 218 identified by the name "CURRENT_USER." (The ellipses in the figures indicate that additional nodes and data entries are not shown.) Although shown as a separate node within the registry, the CURRENT_USER node is typically implemented as an alias to a node for a current user. The $ALL_{13}$ USERS node contains the nodes 203, 204, and 212. The node 203 is identified by the name "Default," the node 204 is identified by the name "JohnSmith," and the node 212 is identified by the name "MaryRichards." The JohnSmith node contains node 205 identified by the name "Software." The Software node contains the node 206 identified by the name "MSWORD." The MSWORD node contains data entries 207, 208, and 209 and node 210. Data entry 207 contains the data entry name "Font" and the data entry value "TimesRoman." Data entry 208 contains the data entry name "BackgroundColor" and the data entry value "green." Data entry 209 contains the data entry name "Language" and the data entry value "English." The node 210 is identified by the name "Spellchecker" and contains the data entry 211. The data entry 211 contains the data entry name "Type" and the data entry value "Legal."

The registry has an associated application programming interface (API) for managing the data in the registry. Using this API, nodes and data entries can be added to, removed from, and retrieved from the registry. The nodes and data entries in the registry are identified by fall path names. For example, data entry 207 is identified by the path name "\$ALL_{13}$ USERS\JohnSmith\Software\MSWORD\Font." (By convention, since all path names begin with the ROOT node, the name ROOT is omitted from path names.) This path name identifies the data entry value "TimesRoman." Similarly, node 220 is identified by the path name "\CURRENT_USER\Software\MSWORD."

When a user, such as Mary Richards, logs on to the computer system, the system loads the configuration information for the user Mary Richards from an application configuration file into the MaryRichards node 212. The system then sets the CURRENT_USER node 218 to be an alias of the MaryRichards node 212. The MaryRichards node contains configuration information for the user Mary Richards. This configuration information can contain both system and application configuration information. System configuration information includes information such as the default background color or default font. The application configuration information includes information for a particular application program. For example, the data entry 207 indicates the font for the word processing application program "MSWORD" for the user Mary Richards. During system configuration, the computer system is configured according to the configuration information in the CURRENT_USER node. Similarly, when an application is started, it uses its configuration information in the CURRENT_USER node.

Some application programs may have their own application configuration files, rather than use the registry to store their configuration information. In particular, application programs that were developed prior to the use of a registry have their own application configuration files. Unfortunately, the computer systems typically do not allow for such application configuration files on a per-user basis. Rather, these application configuration files are typically user independent. Thus, a user is unable to customize the configuration of such application programs to the user's needs. Also, when a local computer system is not connected to the network, the application programs are unable to access a registry on the central computer system. In such situations, the application programs are unable to use per-user configuration information. It would be desirable to have per-user configuration information even when a local computer system is not connected to a central computer system.

SUMMARY OF THE INVENTION

The present invention provides a method and system for allowing system and application configuration files for each user. In a preferred embodiment, when a user logs on to a local computer system, the system copies the application configuration files for the user to folders that are accessible to the application programs that execute on the local computer system. The system also stores location information in a registry to enable the application programs to determine which folder contains their application configuration files. Each user preferably has a user profile file, which contains configuration information that identifies the location of application configuration files for the user (location information) and identifies which application configuration files are to be copied to which local folders so that they are accessible by the application programs (profile reconciliation information). The user profile file is organized as a node of the registry. The location information in the user profile file includes path names of the folders that contain the application configuration files. The profile reconciliation information identifies application configuration files for the user and the local folders in which to store the application configuration files. When a user logs on, the system retrieves the user profile file for the user. The system loads all the configuration information of the user profile file into the local registry in a node for the current user. The system then processes the profile reconciliation information that is in the local registry for the current user by copying the identified application configuration files to the identified local folders and by deleting appropriate application configuration files in the local folder.

The profile reconciliation information includes a node for each set of application configuration files for the user. For example, each application program may have a set of application configuration files. Each node includes data entries for a local path, a central path, a default path, and file names. The local path identifies a local folder and the central path identifies a central folder. Each node may also include a data entry for default path which identifies a folder which may be either local or central and a default data entry which indicates the default path should be used instead of the central path. The file names identify the names of the application configuration files to be copied. Typically, the central folder contains the application configuration files for the user. However, if the user does not have a set of the application configuration files and the node contains a default path, then the default folder contains a set of default application configuration files, which may be copied to a local folder. If the node does not contain a default path, and if the user profile file was loaded from a central home folder, then the central folder is designated the source folder and the local folder is designated the destination folder. Otherwise if the node does not contain a default path, the local folder is designated the source folder and the central folder is designated the destination folder. If an application configuration file exists only at the source folder, it is copied to the destination folder. If an application configuration file exists only in the destination folder, it is deleted. If an application configuration file exists in both the source and destination folders, the more recently updated application configuration file in one folder is copied to the other.

In a preferred embodiment, the present invention provides a method in a computer system for providing configuration files for a user for configuration of a computer system. The method receives an identification of the user. Then, the method locates user profile information which identifies configuration files, a source folder that contains the configuration files, and a destination folder in which to copy the configuration files. For each identified configuration file the method may delete the configuration file from the destination folder. The method also copies the configuration file to the appropriate folder, either source or destination. Then a computer program can access the configuration files in the destination folder during configuration of the computer program.

DETAILED DESCRIPTION OF THE INVENTION

Figure 1:
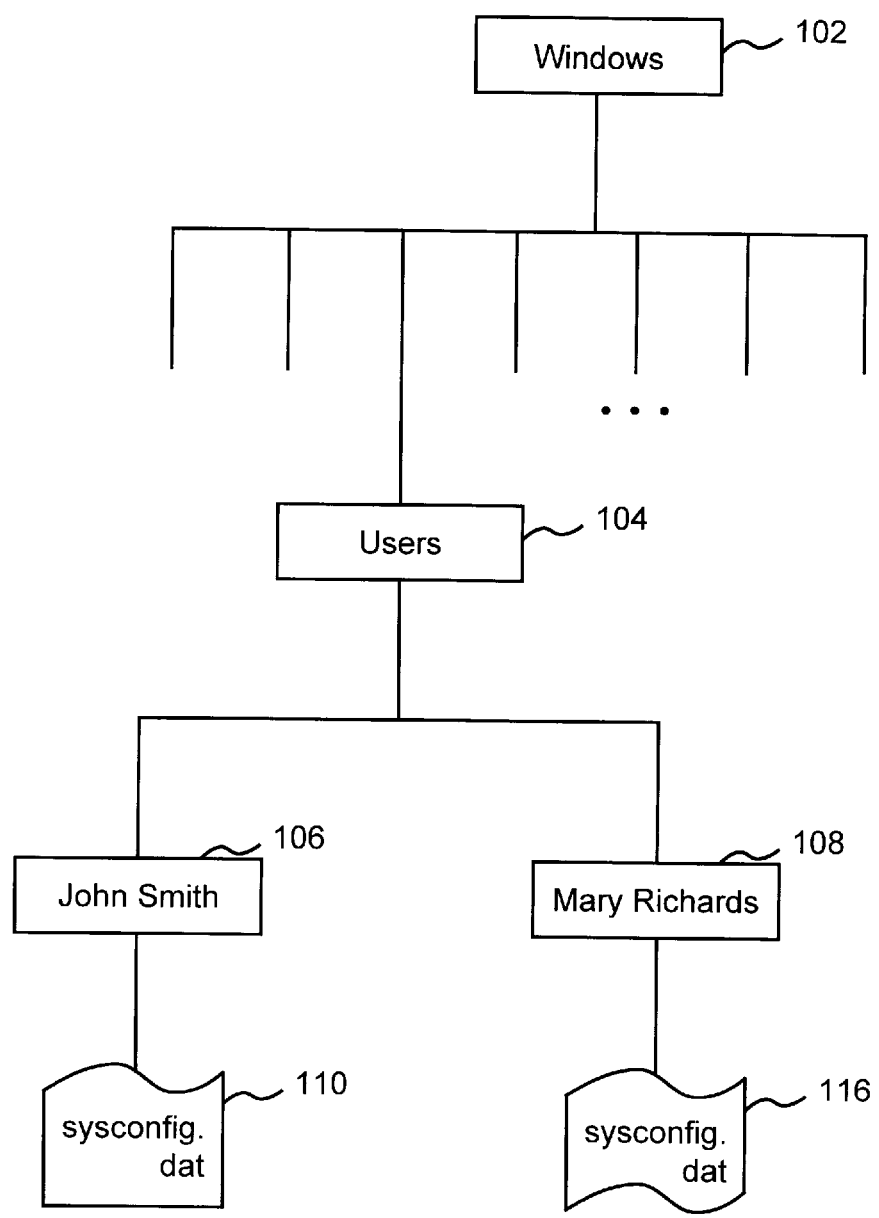
FIG. 1 illustrates a sample conventional directory hierarchy.
Figure 2:
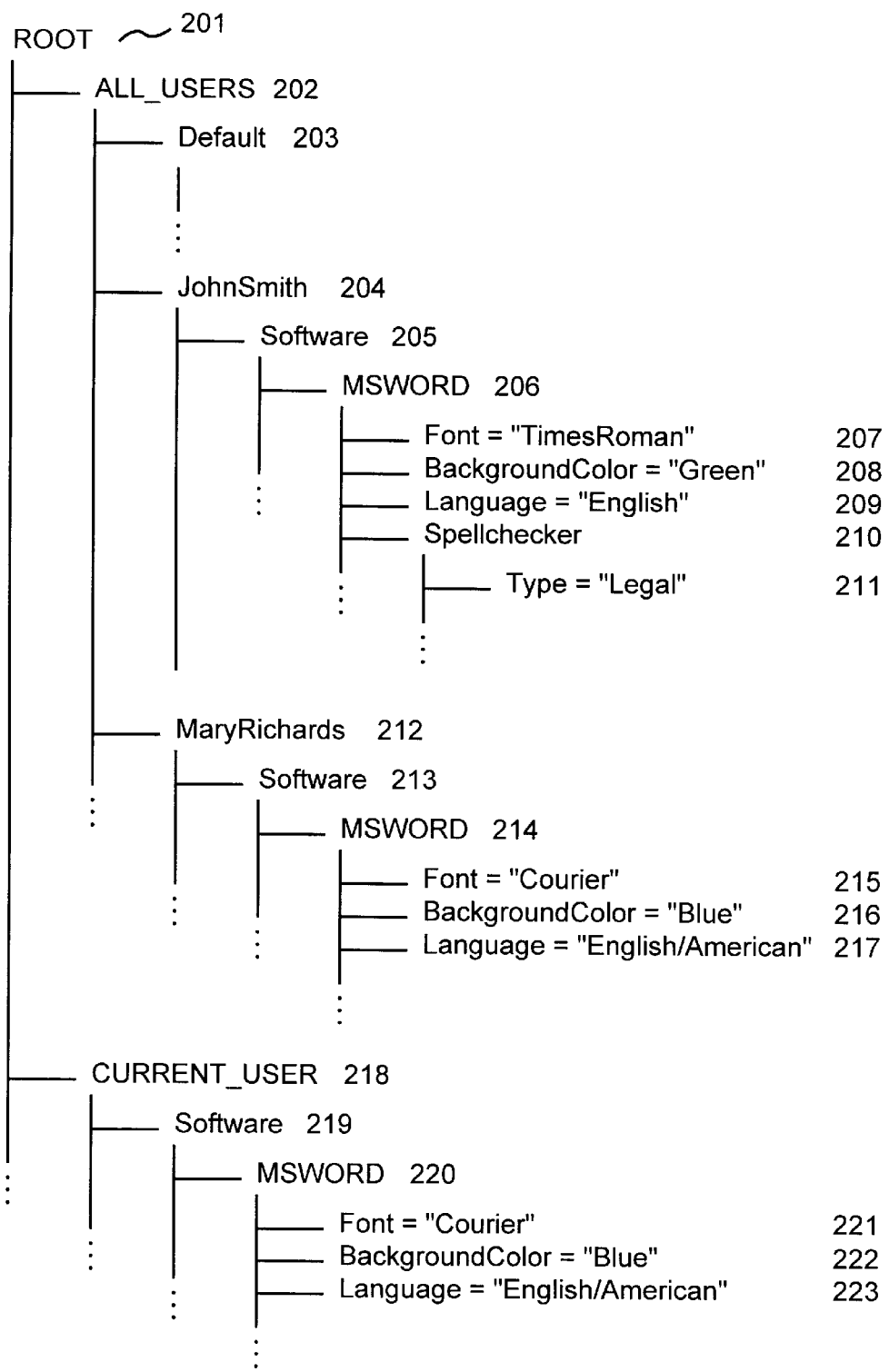
FIG. 2 illustrates a sample portion of a registry.

The present invention provides a method and system for allowing system and application configuration files for each user. In a preferred embodiment, when a user logs on to a local computer system, the system copies the application configuration files for the user to folders that are accessible to the application programs that execute on the local computer system. The system also stores location information in a registry to enable the application programs to determine which folder contains their application configuration files. Each user preferably has a user profile file, which contains configuration information that identifies the location of application configuration files for the user (location information) and identifies which application configuration files are to be copied to which local folders so that they are accessible by the application programs (profile reconciliation information). The user profile file is organized as a node of the registry. The location information in the user profile file includes path names of the folders that contain the application configuration files. The profile reconciliation information identifies application configuration files for the user and the local folders in which to store the application configuration files. When a user logs on, the system retrieves the user profile file for the user. The system loads all the configuration information of the user profile file into the local registry in a node for the current user. The system then processes the profile reconciliation information that is in the local registry for the current user by copying the identified application configuration files to the identified local folders and by deleting appropriate application configuration files in the local folder.

The profile reconciliation information includes a node for each set of application configuration files for the user. For example, each application program may have a set of application configuration files. Each node includes data entries for a local path, a central path, a default path, and file names. The local path identifies a local folder and the central path identifies a central folder. Each node may also include a data entry for default path which identifies a folder which may be either local or central and a default data entry which indicates the default path should be used instead of the central path. The file names identify the names of the application configuration files to be copied. Typically, the central folder contains the application configuration files for the user. However, if the user does not have a set of the application configuration files and the node contains a default path, then the default folder contains a set of default application configuration files, which may be copied to a local folder. If the node does not contain a default path, and if the user profile file was loaded from a central home folder, then the central folder is designated the source folder and the local folder is designated the destination folder. Otherwise if the node does not contain a default path, the local folder is designated the source folder and the central folder is designated the destination folder. If an application configuration file exists only at the source folder, it is copied to the destination folder. If an application configuration file exists only in the destination folder, it is deleted. If an application configuration file exists in both the source and destination folders, the more recently updated application configuration file in one folder is copied to the other.

After log on is complete, the local folders contain copies of the application configuration files for the user. When applications are executed, the applications can then access these application configuration files to retrieve their configuration information. In a preferred embodiment, after each set of application configuration files is copied to a local folder, a data entry with a predefined data entry name and a data entry value that contains the path name of that local folder is added to the local registry. This data entry can be used by an application program to locate its application configuration files. To access the application configuration files, the application program retrieves the data entry with the predefined data entry name and uses its data entry value as the location of the local folder in which its application configuration files are stored. Alternatively, the local folder could have a predefined name so that the application program could avoid accessing the registry to determine the name of the local folder.

Figure 3:
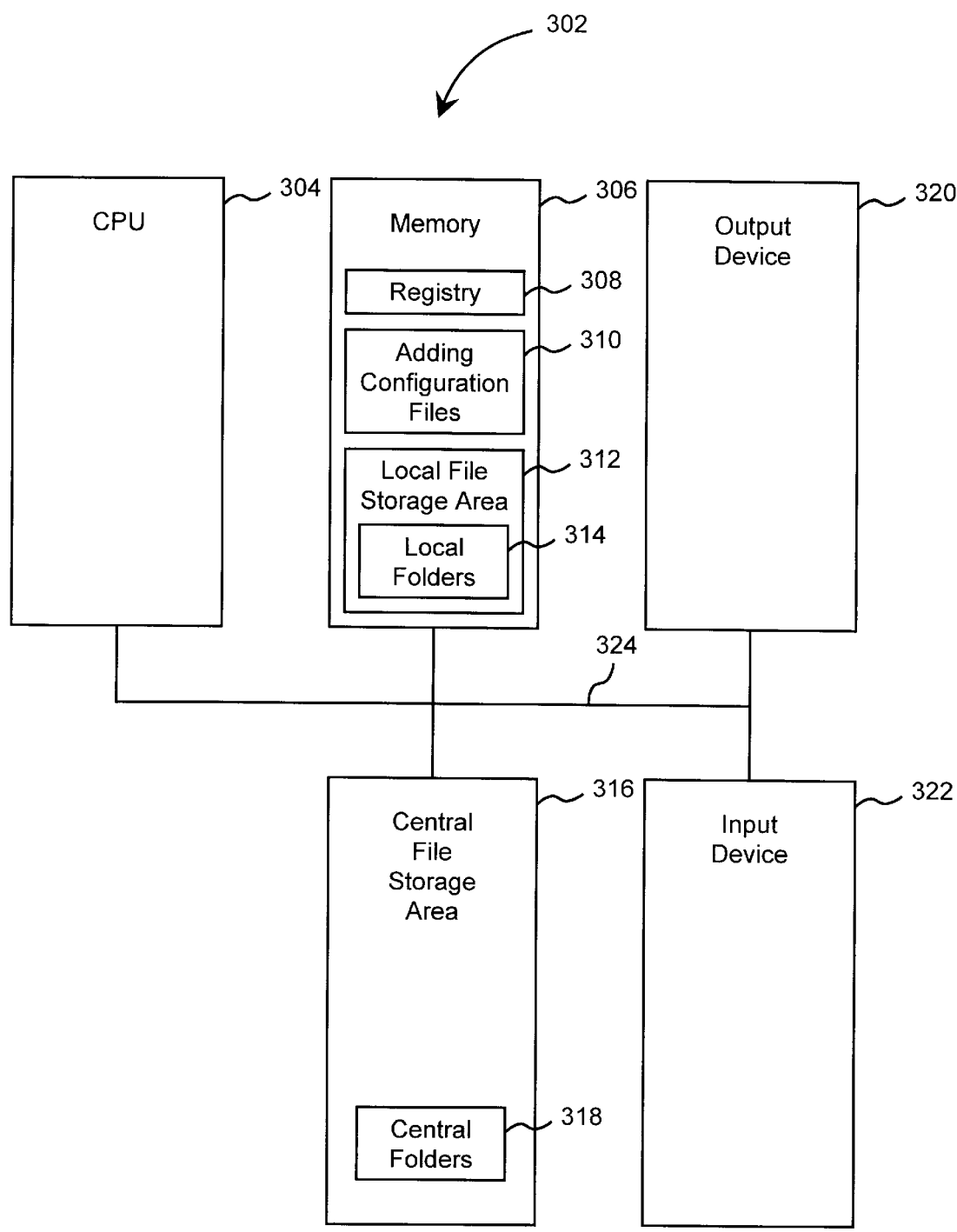
FIG. 3 illustrates an overview diagram of an apparatus for adding configuration files.

FIG. 3 illustrates an overview diagram of an apparatus for adding application configuration files. The computer system 302 contains a CPU 304 and a memory 306. The memory contains a registry 308, an adding configuration files engine 310, and a local file storage area 312 which includes local folders 314. The computer system additionally contains a central file storage area 316 which includes central folders 318. The computer system also contains an output device 320, such as a display screen, and an input device 322, such as a keyboard and mouse. A bus 324 connects the components of the computer system. The CPU executes the adding configuration files engine after a user logs on to the computer system. The adding configuration files engine adds user profile information to the registry for the user and then accesses the registry to retrieve information that identifies the folders containing the application configuration files. The adding configuration files engine then copies the appropriate application configuration files to the local folders and delete the appropriate application configuration files from the local folders. The adding configuration files engine adds location information into the registry that identifies the location of the local folders containing the application configuration files. The configuration information contained in the application configuration files in the local folders is then used to configure the computer system.

Figure 4:
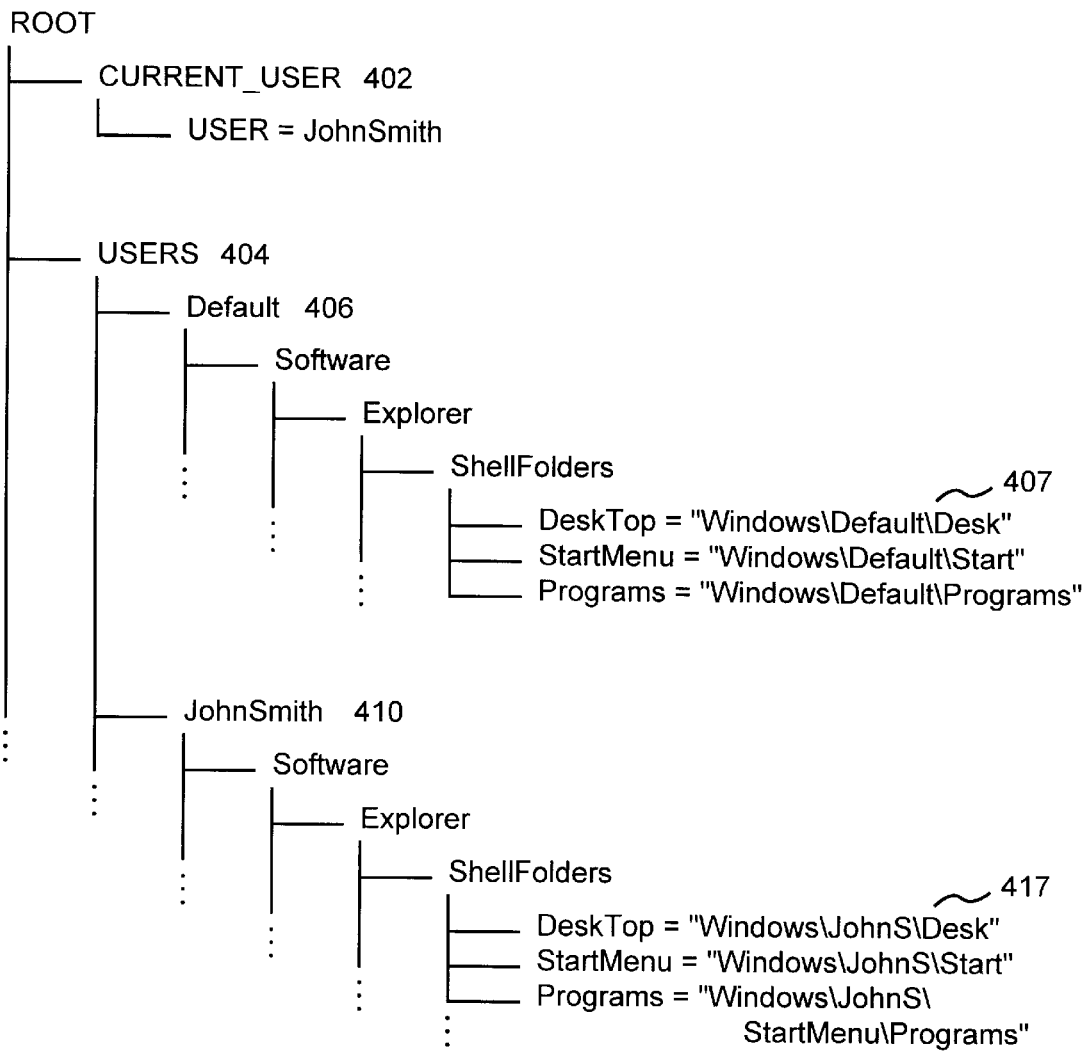
FIG. 4 illustrates a sample registry in a preferred embodiment of the present invention.

FIG. 4 illustrates a sample registry in a preferred embodiment of the present invention. The registry 401 contains the nodes: a CURRENT_USER node 402 and a USERS node 404. The USERS node contains a Default node 406. The Default node contains location information that identifies default configuration files which typically may be used to configure the computer system when no one is logged on. The USERS node also contains a node for the user who has logged on to the local computer system. For example, a JohnSmith node 410 is in the registry because the user John Smith has logged on to this local computer system. The JohnSmith node contains location information that identifies application configuration files for the user John Smith. For example, the node "\USERS\JohnSmith\Software\Explorer\ShellFolders" contains a data entry 417 which contains the data entry name "Desktop" and the data entry value "\Windows\JohnS\Desk." This data entry indicates that certain of the application configuration files for the Explorer application program are stored in the folder with the path name "Windows\JohnS\Desk." The CURRENT_USER node indicates an alias of the node for the current user (e.g., the JohnSmith node).

Figure 5:
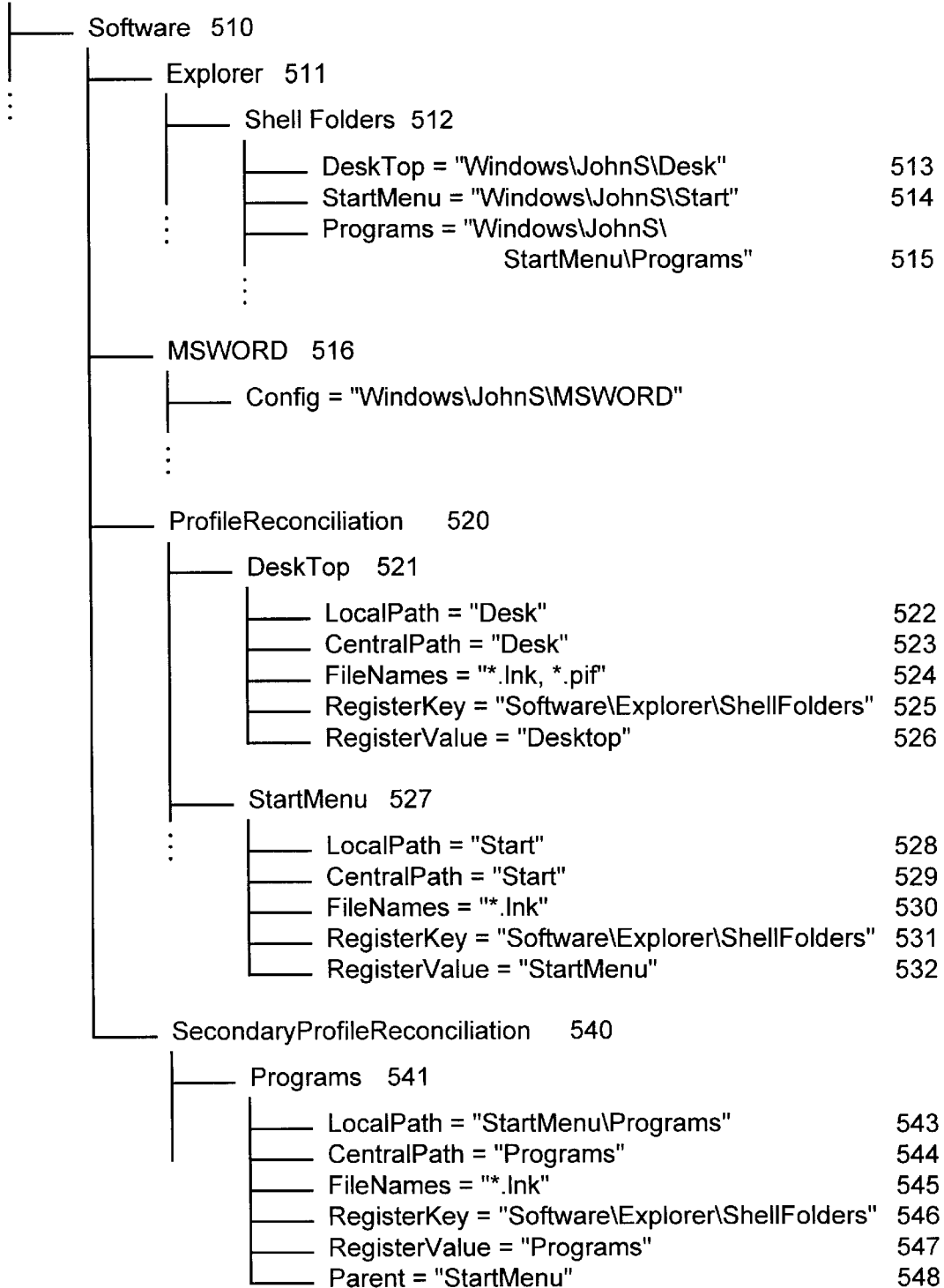
FIG. 5 illustrates a sample user profile file in a preferred embodiment of the present invention.

FIG. 5 illustrates a sample user profile file in a preferred embodiment of the present invention. The user profile file is organized as a node of the registry. The node identified by the name "JohnSmith" indicates that the node 501 contains location information that identifies application configuration files for the user John Smith. The JohnSmith node contains a Software node 510. The Software node contains a node for each application program that the user John Smith typically uses, a Profile Reconciliation node 520, and a Secondary Profile Reconciliation node 540. For instance, the Explorer node 511 corresponds to the Explorer application program. The Explorer node contains the node ShellFolders 512, which contains location information that identifies the user John Smith's application configuration files containing configuration information for the screen display of the Explorer application program. The ShellFolders node contains three data entries. The StartMenu data entry 514 contains the data entry value "Windows\JohnS\Start." The data entry value "Windows\JohnS\Start" is a path name to a local folder which contains application configuration files for the start menu of the Explorer application program for the user John Smith.

When a user logs on to the computer system, the computer system loads the user's user profile file into the local registry under the USERS node 404 and sets the CURRENT_USER node 402 to indicate the current user. The computer system loads the most recently updated user profile file for the user, if a user profile file exists, otherwise it loads a default user profile file. To determine whether a user profile file exists, the computer system determines the user's local home folder and central home folder. (Home folders may be assigned by a system administrator when a user is first given authorization to log on to the computer system.) If a user profile file is found only in the local home folder or only in the central home folder, then the found user profile file is loaded into the registry. If a user profile file is found in both the local and central home folder, then the more recently updated user profile file is loaded into the registry. If a user profile file is not found in either the local or central home folders, a default user profile file is copied to the local home folder and loaded into the registry under a node for the current user contained in the USERS node. In a preferred embodiment, the loading of a node is accomplished by setting the node to point to the user profile file, rather than copying data. Thus, when John Smith logs on, the JohnSmith node 501 becomes a part of the registry as a node within the USERS node. Then, the CURRENT_USER node is set to be an alias for the JohnSmith node.

The JohnSmith node 501 also contains a ProfileReconciliation node 520. The ProfileReconciliation node contains nodes corresponding to each set of application configuration files to be copied. These nodes contain data entries that indicate location information which identify the application configuration files. The ProfileReconciliation node of FIG. 5 contains a Desktop node 521 and a StartMenu node 527. Each of these nodes contains several data entries that identify application configuration files. The LocalPath data entry contains a data entry value that identifies a local folder which contains application configuration files. For example, the LocalPath data entry 522 identifies the local folder "Desk." The CentralPath data entry contains a data entry value that identifies a central folder which contains application configuration files. For example, the CentralPath data entry 523 identifies the central folder "Desk." The FileNames data entry contains a data entry value that identifies the names of the application configuration files that comprise the set of application configuration files. The file names may be identified using wild card characters, and may include multiple file names, separated by commas. For example, the FileNames data entry 524 identifies the application configuration files "*.1nk, *.pif." The RegisterKey and RegisterValue data entries are used in storing location information so that an application program can locate its application configuration files. The RegisterKey data entry identifies a node in the registry in which the location information for the application program is to be stored. The RegisterValue data entry identifies a data entry name contained in the node identified by RegisterKey. As will be discussed in detail below, the identified data entry in the identified node will be set to the path name to the local folder containing application configuration files. The local path identifies the path name to the local folder which is identified by the Local Path data entry. For example, the RegisterKey data entry 525 contains the data entry value "Software\Explorer\ShellFolders." The RegisterValue data entry 526 contains the data entry value "Desktop." This RegisterKey and RegisterValue data entries identify the Desktop data entry 531 contained in the "Software\Explorer\ShellFolders" node. The nodes contained in a ProfileReconciliation node may also contain other types of data entries, such as a Default data entry, a DefaultPath data entry, a Subtree data entry, a Mandatory data entry, and a OneTime data entry, which are described in detail below.

Figure 6:
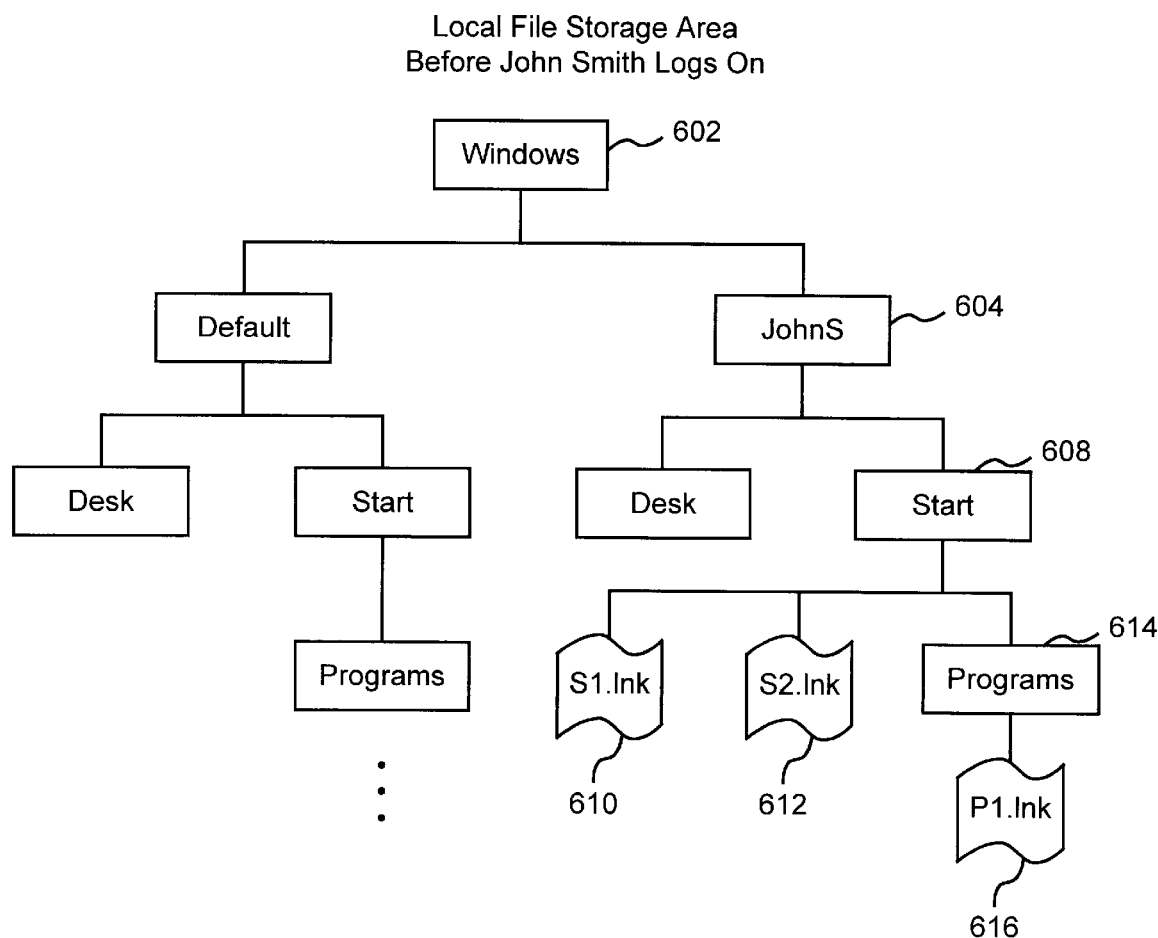
FIG. 6 illustrates the local file storage area before the user John Smith logs on to the computer system.
Figure 7:
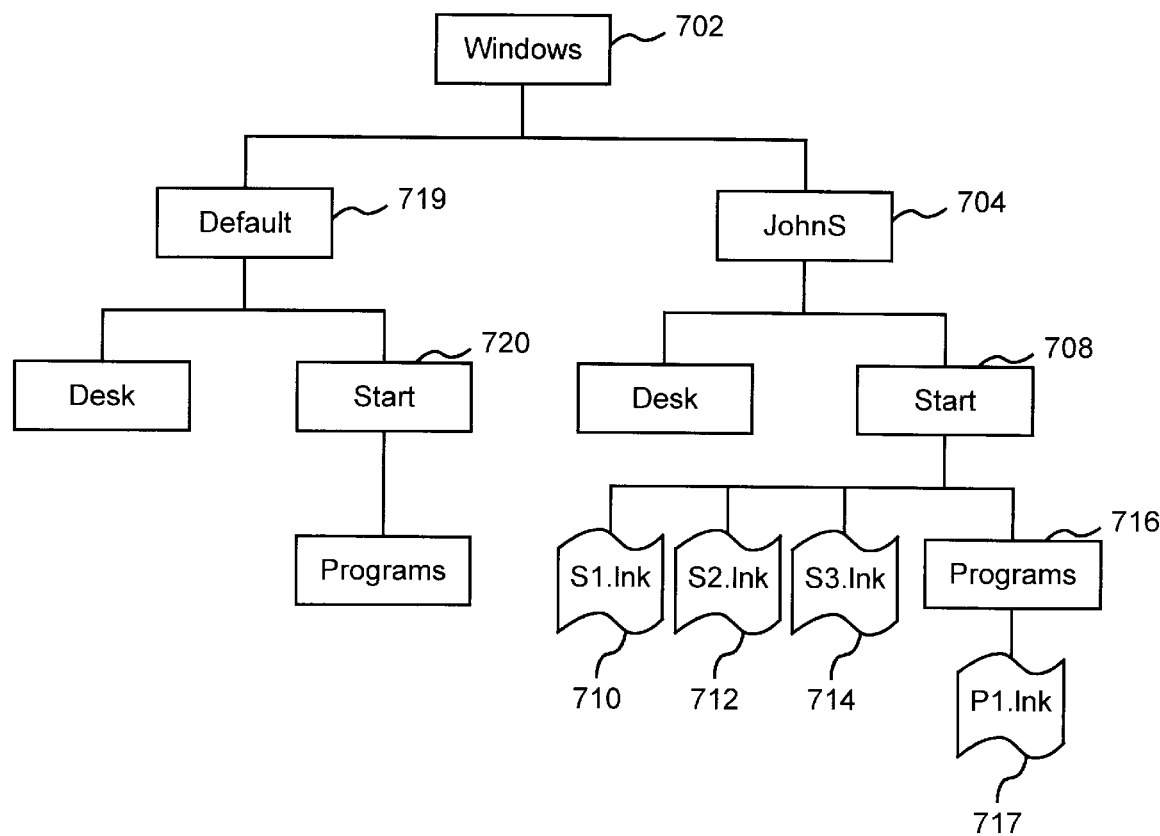
FIG. 7 illustrates the central file storage area before the user John Smith logs on to the computer system.
Figure 8:
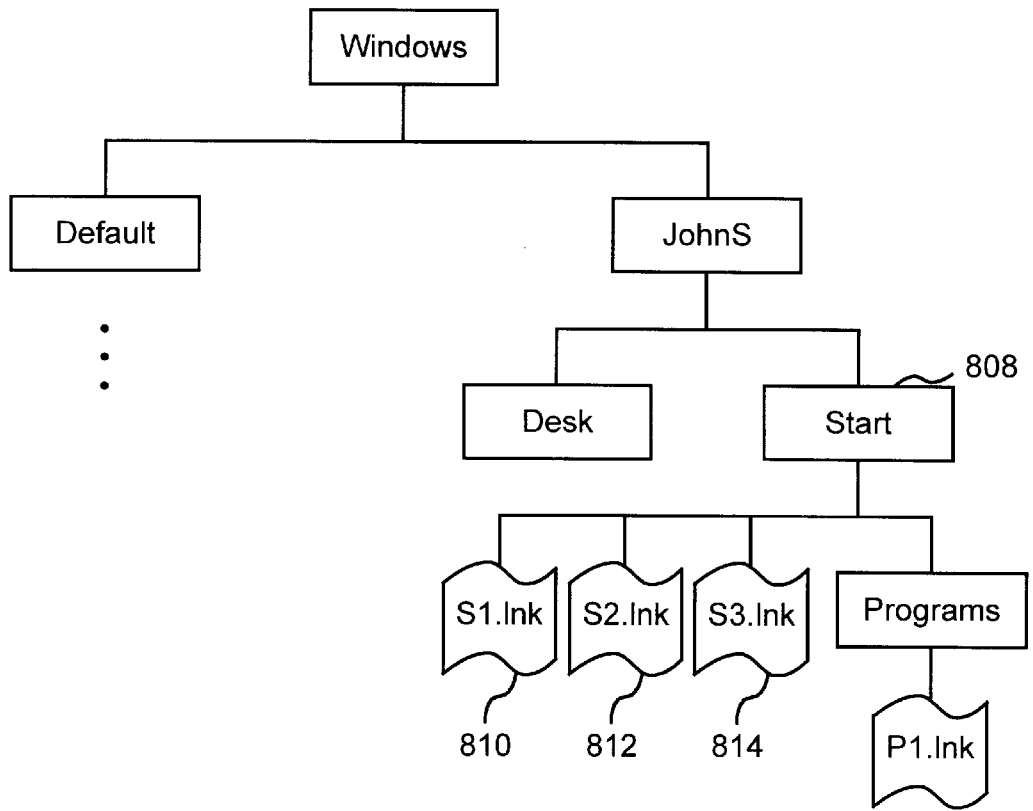
FIG. 8 illustrates the local file storage area after the system has processed the StartMenu node contained in the ProfileReconciliation node for the user John Smith.

FIGS. 6, 7, and 8 illustrate the loading of the application configuration files for the user John Smith. FIG. 6 illustrates the local file storage area before the user John Smith logs on to the computer system. The local file storage area contains the folder "Windows" 602. The folder "Windows" contains several folders, including the folder "JohnS" 604. The folder "JohnS" contains the folder "Start" 608. The folder "Start" 608 contains application configuration files "S1.1.nk" 610 and "S2.1nk" 612 and contains the folder "Programs" 614, which contains the application configuration file "P1.1nk" 616.

FIG. 7 illustrates the central file storage area before the user John Smith logs on to the computer system. The central file storage area contains a folder "Windows" 702. The folder "Windows" contains several folders, including the folder "JohnS" 704. The folder "JohnS" contains the folder "Start" 708. The folder "Start" 708 contains application configuration files "S1.1.nk" 710, "S2.1nk" 712, and "S3.1nk" 714 and contains the folder "Programs" 716, which contains the application configuration file "P1.1nk" 717.

After loading the user profile file of FIG. 5 for the user John Smith into the registry, the system processes the ProfileReconciliation node 520. The following describes the processing of the StartMenu node 527 contained in the ProfileReconciliation node. First, the system retrieves the data entries in the StartMenu node. The local folder containing application configuration files is identified by the LocalPath data entry. The system uses the RegisterKey data entry and RegisterValue data entry to generate a local path which is the path name to the local folder. If the data entry identified by the RegisterValue data entry in the node identified by the RegisterKey data entry exists, the system sets the data entry value of the identified data entry to be the local path. If it does not exist, the system generates the local path by appending the name of the folder identified by the LocalPath data entry to a predetermined path name to a local file storage area where application configuration files are typically stored. For example, the RegisterKey data entry 531 identifies the node "Software\Explorer\ShellFolders" and the RegisterValue data entry 532 identifies the Start-Menu data entry. The StartMenu data entry 514 in the identified ShellFolders node 512 does exist, and it contains the data entry value "Windows\JohnS\Start," which identifies the path name to the local folder containing application configuration files. Then, the system sets the local path to be "Windows\JohnS\Start." Next, the central path, which is the path name to the Central folder identified by the CentralPath data entry, is generated by appending the name of the folder keys to a predetermined path name to a central file storage area where application configuration files are typically stored. For example, the system may append the name of the folder "Start" to a predetermined path, such as "Windows\JohnS," to determine that the central path is "Windows\JohnS\Start."

Before copying or deleting application configuration files in the appropriate folder, the system designates one folder to be a source folder and another folder to be a destination folder. The system then obtains a set of application configuration files by searching for application configuration files ending with ".1nk," as indicated by the FileNames data entry 530, in the source folder and in the destination folder.

The system designates the local folder to be the source folder and the central folder to be the destination folder when the user profile file in the local folder was the only user profile file found or the local folder contained a more recently updated user profile file than a user profile file from the central folder. The system designates the central folder to be the source folder and the local folder to be the destination folder when the user profile file in the central folder was the only user profile file found or more recently updated than a user profile file from the local folder. If a node contains a Default data entry, then the default folder identified by the DefaultPath data entry is designated the source folder and the local folder is designated the destination folder. If an application configuration file exists only in the source folder, the system copies it to the destination folder. If an application configuration file exists only in the destination folder, then the system deletes it. If an application configuration file exists in both the source and destination folders, the more recently updated application configuration file in one folder is copied to the other. If a node contains the Default data entry, however, application configuration files are not copied from the destination folder to the source folder. Also, if a node contains the Mandatory data entry, application configuration files are not copied from the local folder to the central folder.

For the following example, the local folder is the source folder, the central folder is the destination folder, and the node does not contain the Mandatory data entry. For example, since both the local folder 608 and central folder 708 contain the application configuration file "S1.1nk," and assuming the local folder contains the more recently updated version of the application configuration file "S1.1nk," the system copies the application configuration file "S1.1nk." from the local to the central folder. Since both the local and central folders contain the application configuration file "S2.1nk," and assuming the central folder 708 contains the more recently updated version of the application configuration file "S2.1nk," the system copies the application configuration file "S2.1nk" from the central folder to the local folder. Since only the central folder contains the application configuration file "S3.1nk," the system copies the file "S3.1nk" from the central folder to the local folder.

FIG. 8 illustrates the local file storage area after the system has processed the StartMenu node 527 contained in the Profile Reconciliation node 520 for the user John Smith. The local folder "Windows\JohnS\Start" 608 contains the application configuration files "S1.1nk" 810, "S2.1nk" 812, and "S3.1nk" 814.

Figure 9:
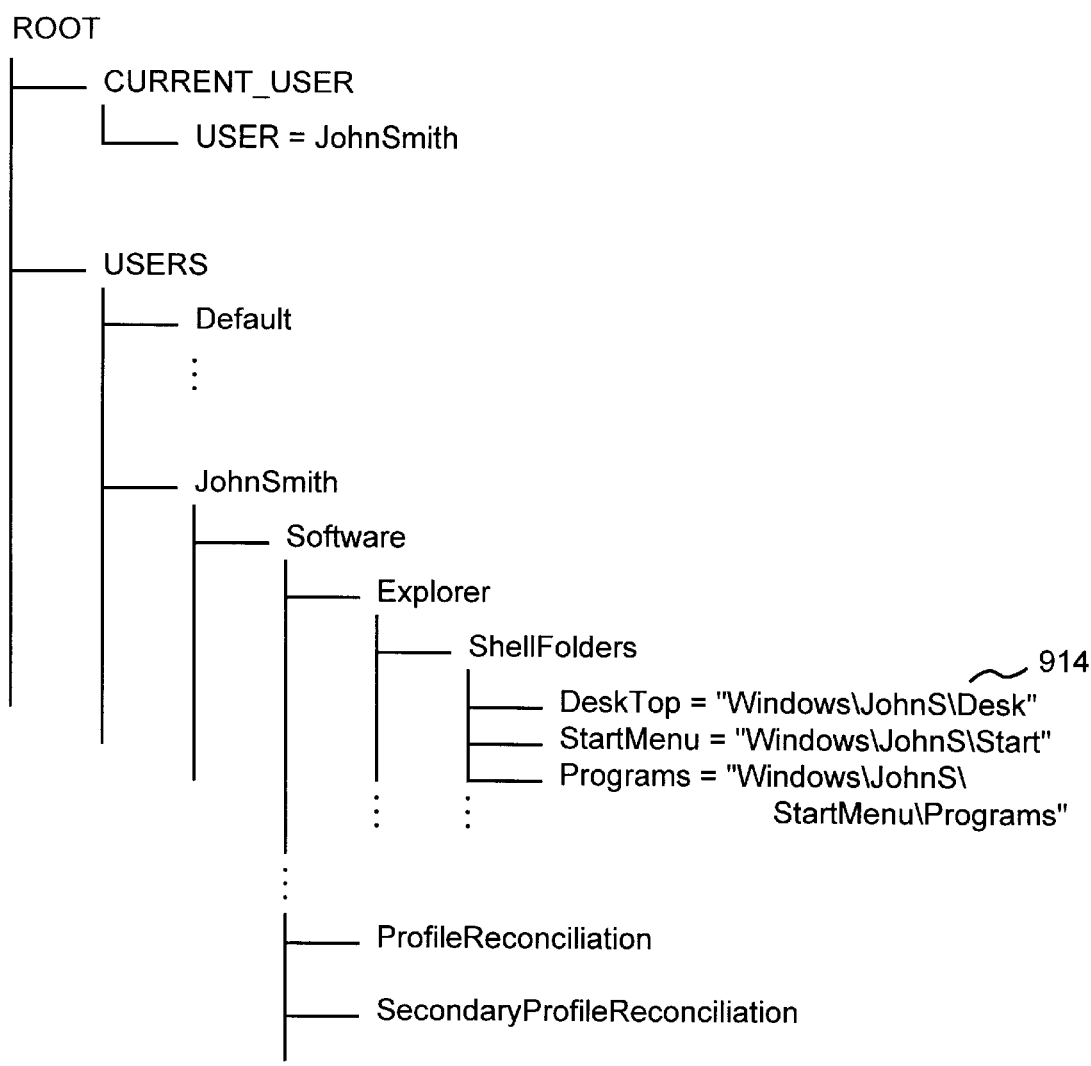
FIG. 9 illustrates the sample registry after the system has processed the ProfileReconciliation node.

FIG. 9 illustrates the sample registry after the system has processed the ProfileReconciliation node 520. After copying the identified application configuration files to the identified local folders, the system stores location information that identifies those local folders in the registry. As mentioned before, each node contained in a ProfileReconciliation node contains a RegisterKey data entry and a RegisterValue data entry. For example, in FIG. 5, the RegisterKey data entry 531 contains the data entry value "Software\Explorer\ShellFolders." The RegisterValue data entry 532 contains the data entry value "StartMenu." Using this location information, the system updates a data entry contained in the node identified by the RegisterKey data entry. For example, the StartMenu data entry 514 is updated with the local path name "\Windows\JohnS\Start" as shown in the StartMenu data entry 914.

An application may now retrieve its most recently updated application configuration files by accessing the appropriate data entry in the registry or by accessing the identified local folder.

FIGS. 10 through 15 are data flow diagrams that illustrate the processing to load the registry with a user profile file and process the data in the user profile file.

Figure 10:
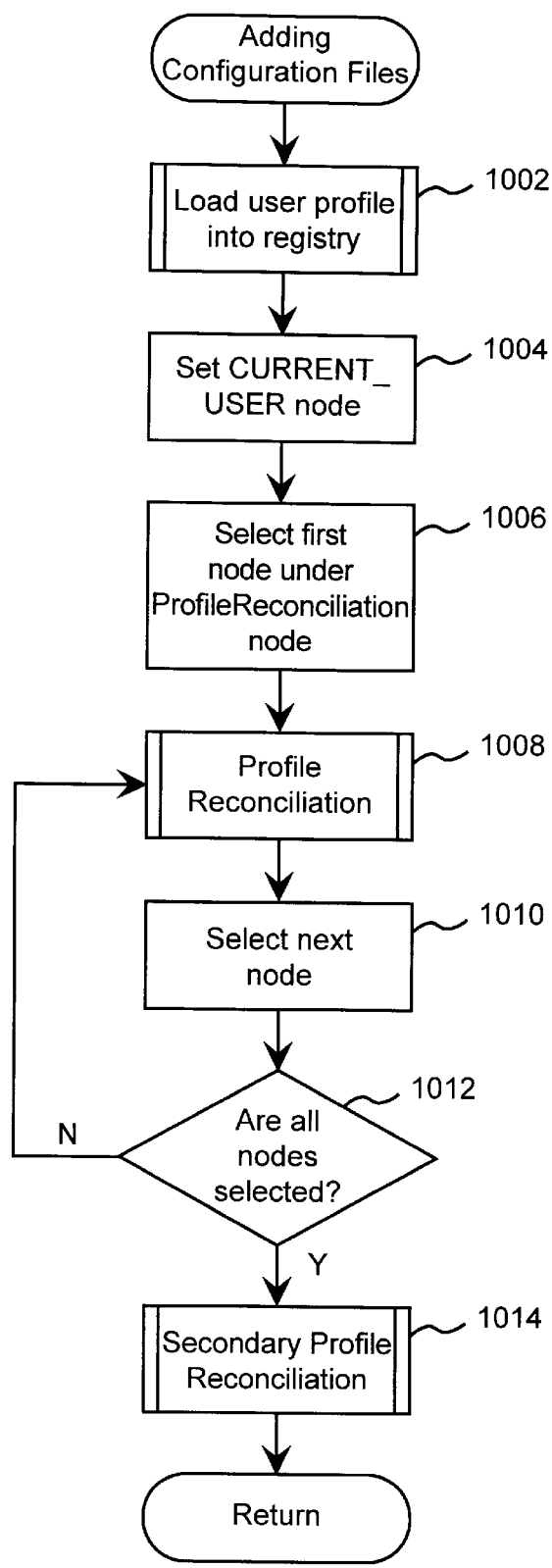
FIG. 10 illustrates an overview flow diagram of the adding configuration files routine.

FIG. 10 illustrates an overview flow diagram of the adding configuration files routine. The adding configuration files routine is an implementation of the adding configuration files engine. The adding configuration files routine first loads a user profile file into the USERS node of the registry. Then, the adding configuration files routine sets the CURRENT_USER node to be an alias for the node for the current user contained in the USERS node. An application program can retrieve the locations of the application configuration files for the current user by accessing the CURRENT_USER node. For each node contained in the ProfileReconciliation node of the CURRENT_USER node, the adding configuration files routine performs profile reconciliation.

The adding configuration files routine is passed the name of the user that has logged on. In step 1002, the adding configuration files routine loads the user profile file into the registry. (The double bars of the box of a step indicate that the step is described in detail in another flow diagram.) In step 1004, the adding configuration files routine sets the CURRENT_USER node to be an alias for the node for the current user contained in the USERS node. In steps 1006 through 1012, the adding configuration files routine loops, processing each node contained in the ProfileReconciliation node. In step 1006, the adding configuration files routine selects the first node contained in the ProfileReconciliation node. In step 1008, the adding configuration files routine performs profile reconciliation on the selected node. In step 1010, the adding configuration files routine selects the next node contained in the ProfileReconciliation node. In step 1012, if all the nodes contained in the ProfileReconciliation node have been already selected, the adding configuration files routine continues at step 1014, else the adding configuration files routine loops to step 1008 to perform profile reconciliation on the selected node. In step 1014, the adding configuration files routine performs secondary profile reconciliation. Secondary profile reconciliation, as described below in detail, specifies which files in subfolders of the folders processed during profile reconciliation should also be copied and adds location information into the registry for these subfolders. The adding configuration files routine then returns.

Figure 11:
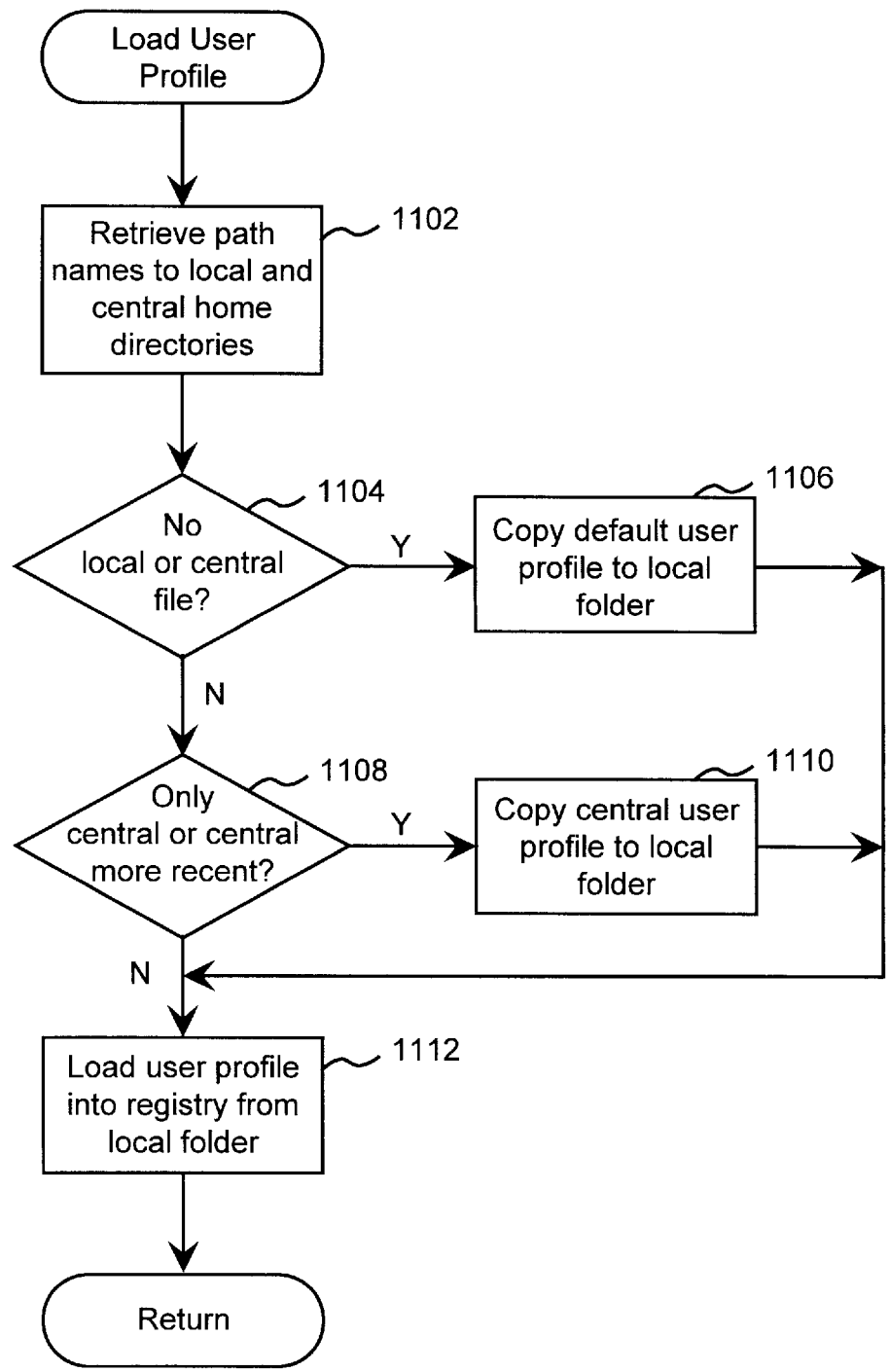
FIG. 11 illustrates a detailed flow diagram of the load user profile routine.

FIG. 11 illustrates a detailed flow diagram of the load user profile routine. The load user profile routine checks the user's local home folder and central home folder for a user profile file and loads the appropriate file into the registry. The load user profile routine is passed the name of the user that has logged on. In step 1102, the load user profile routine retrieves the path names to the local and central home folders for the user. The path names to the local and central home folders are preferably maintained on a per-user basis in a central database. In step 1104, if there is no user profile file in either the local or central home folder, then the load user profile routine continues at 1106, else the load user profile routine continues at step 1108. In step 1106, the load user profile routine copies a default user profile file to the local directory and continues at step 1112. In step 1108, if there is a user profile file only in the central home folder or the user profile file in the central home folder is more recently updated than the user profile file in the local home folder, then the load user profile routine continues at step 1110, else the load user profile routine continues at step 1112. In step 1110, the load user profile routine copies the user profile file from the central home folder to the local home folder and continues at step 1112. In step 1112, the load user profile routine loads the user profile file from the local home folder into the registry under both the CURRENT_$_{USER}$ and the USERS nodes and then returns.

Figure 12:
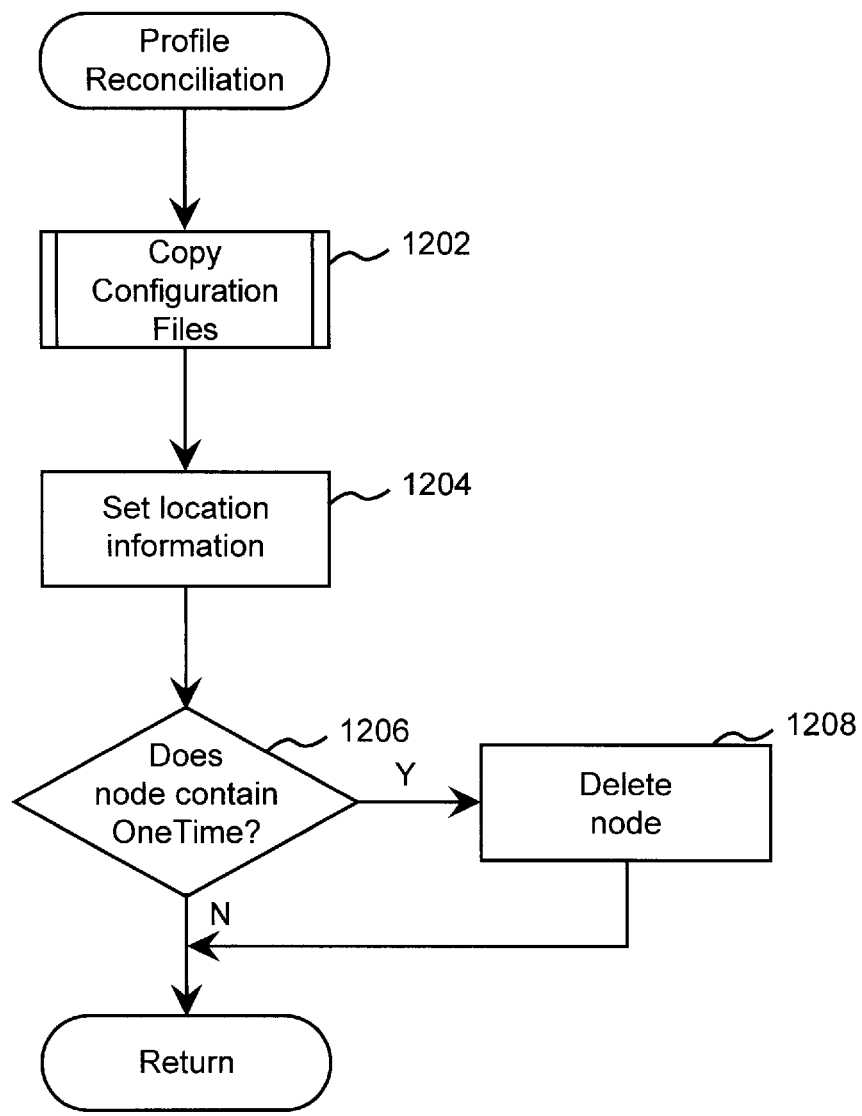
FIG. 12 illustrates a detailed flow diagram of the profile reconciliation routine.

FIG. 12 illustrates a detailed flow diagram of the profile reconciliation routine. The profile reconciliation routine is passed a node contained in the ProfileReconciliation node, copies the application configuration files identified by that node, and updates location information. In step 1202, the profile reconciliation routine copies the application configuration files to the identified folders based on the information in the passed node. In step 1204, the profile reconciliation routine sets a node in the registry to identify the local folder containing the application configuration files based on the RegisterKey and RegisterValue data entries in the passed node. Since the user profile file is preferably added to the registry through the use of a reference, any modification to date in the registry modifies the data in the user profile file. In step 1206, if the selected node contains the data entry OneTime, then the profile reconciliation routine continues at step 1208, else it returns. In step 1208, the profile reconciliation routine deletes the selected node from the registry and returns.

Figure 13:
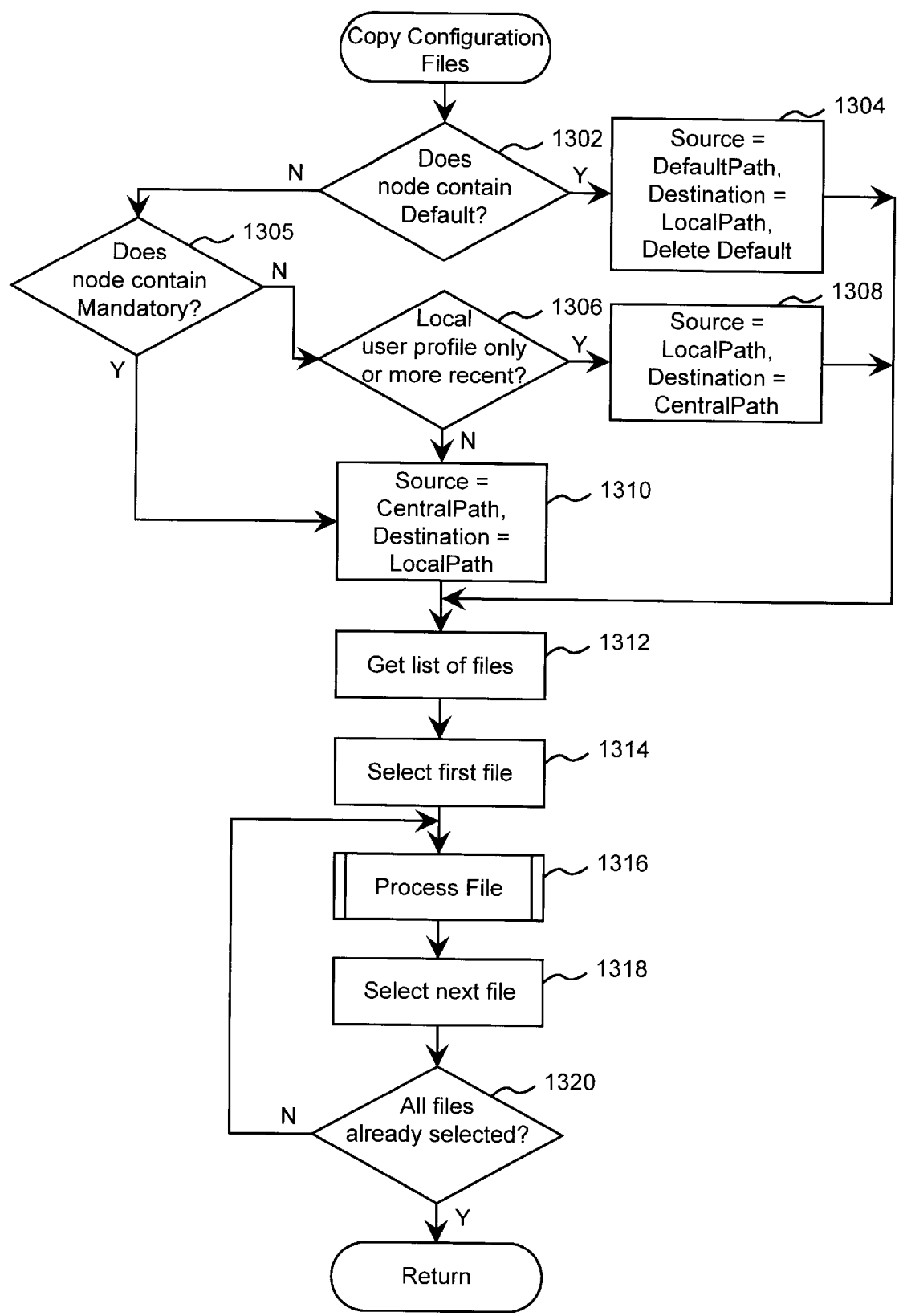
FIG. 13 illustrates a detailed flow diagram of the copy configuration files routine.

FIG. 13 illustrates a detailed flow diagram of the copy configuration files routine. The copy configuration files routine is passed a ProfileReconciliation node and controls the copying of the identified application configuration files. In step 1302, if the passed node contains a Default data entry, the copy configuration files routine continues at step 1304, else it continues at step 1305. In step 1304, the copy configuration files routine sets the default folder identified by the DefaultPath data entry to be the source folder, sets the local folder identified by the LocalPath data entry to be the destination folder, and it deletes the Default data entry from the node. In step 1305, if the node contains a Mandatory data entry, the copy configuration files routine continues at step 1310, else it continues at step 1306. In step 1306, if a user profile file existed only in the local folder or the user profile file in the local folder was more recently updated than the user profile file in the central folder, identified by the CentralFolder data entry, then the copy configuration files routine continues at step 1308, else it continues at step 1310. In step 1308, the copy configuration file sets the local folder to be the source folder and the central folder to be the destination folder. In step 1310, the copy configuration files routine sets the central folder to be the source folder and sets the local folder to be the destination folder. In step 1312, the copy configuration files routine creates a list of application configuration files by searching for application configuration files having a file name identified by the FileNames data entry in the source and destination folders. In step 1314, the copy configuration files routine selects the first application configuration file. In step 1316, the copy configuration files routine processes the selected application configuration file. In step 1318, the copy configuration files routine selects the next application configuration file. In step 1320, if all application configuration files have been selected, the copy configuration files routine returns, else it loops to step 1316 to process the next file.

Figure 14:
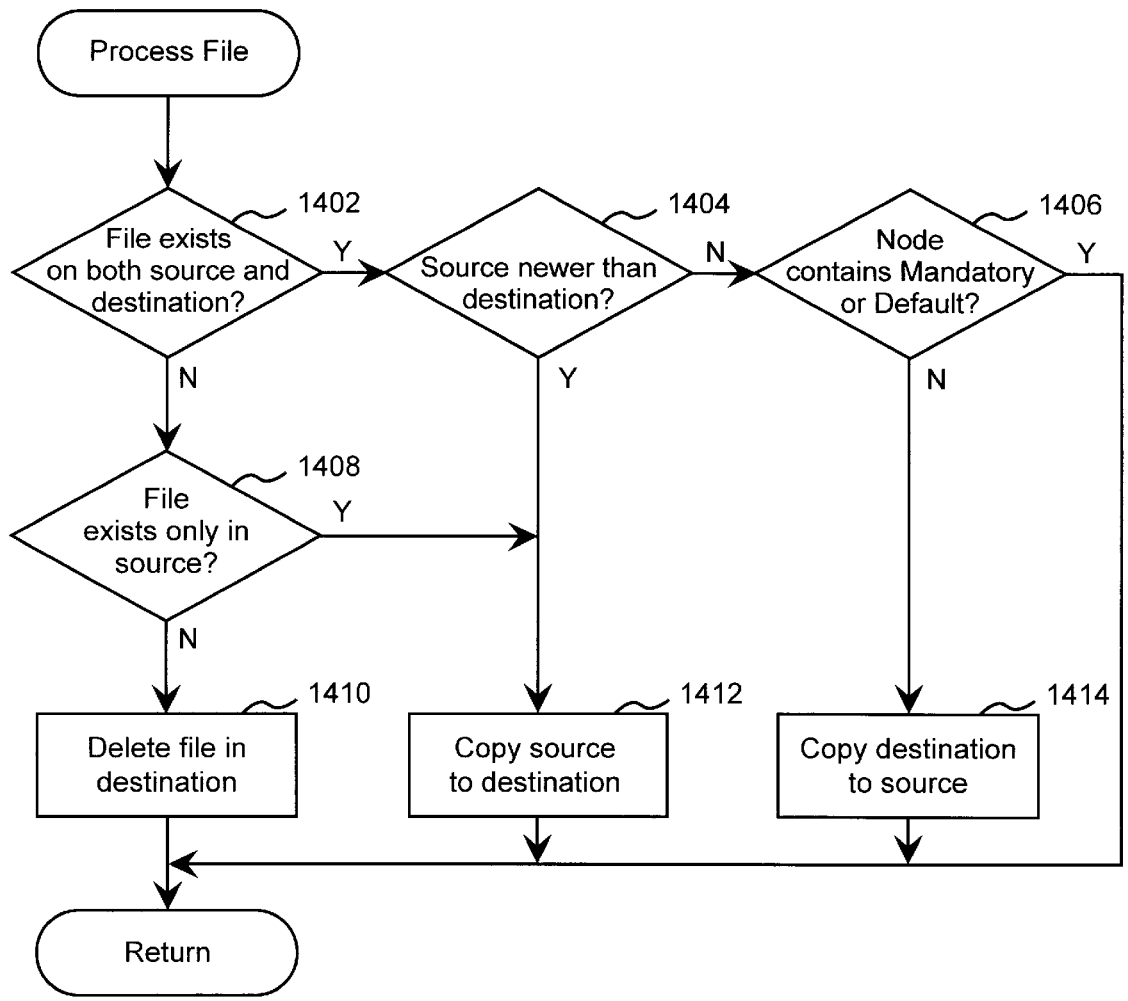
FIG. 14 illustrates a detailed flow diagram of the process file routine.

FIG. 14 illustrates a detailed flow diagram of the process file routine. The process file routine is passed an application configuration file to copy to the appropriate locations and a node contained in a ProfileReconciliation node. In step 1402, if the application configuration file exists in both the source and destination folders, the process file routine continues at step 1404, else it continues at step 1408. In step 1404, if the application configuration file in the source folder is newer than the file in the destination folder, the process file routine continues at step 1412, else it continues at step 1406. In step 1406, if the node contains the Mandatory data entry and the central folder is the source folder, or if the node contains the Default data entry, the process file routine returns, else it continues at step 1414. In step 1408, if only an application configuration file in the source folder exists, the process file routine continues at step 1412, else it continues at step 1410. In step 1410, the process file routine deletes the application configuration file in the destination folder. In step 1412, the process file routine copies the application configuration file from the source folder to the destination folder. In step 1414, the process file routine copies the application configuration file from the destination folder to the source folder. The process file routine then returns.

Figure 15:
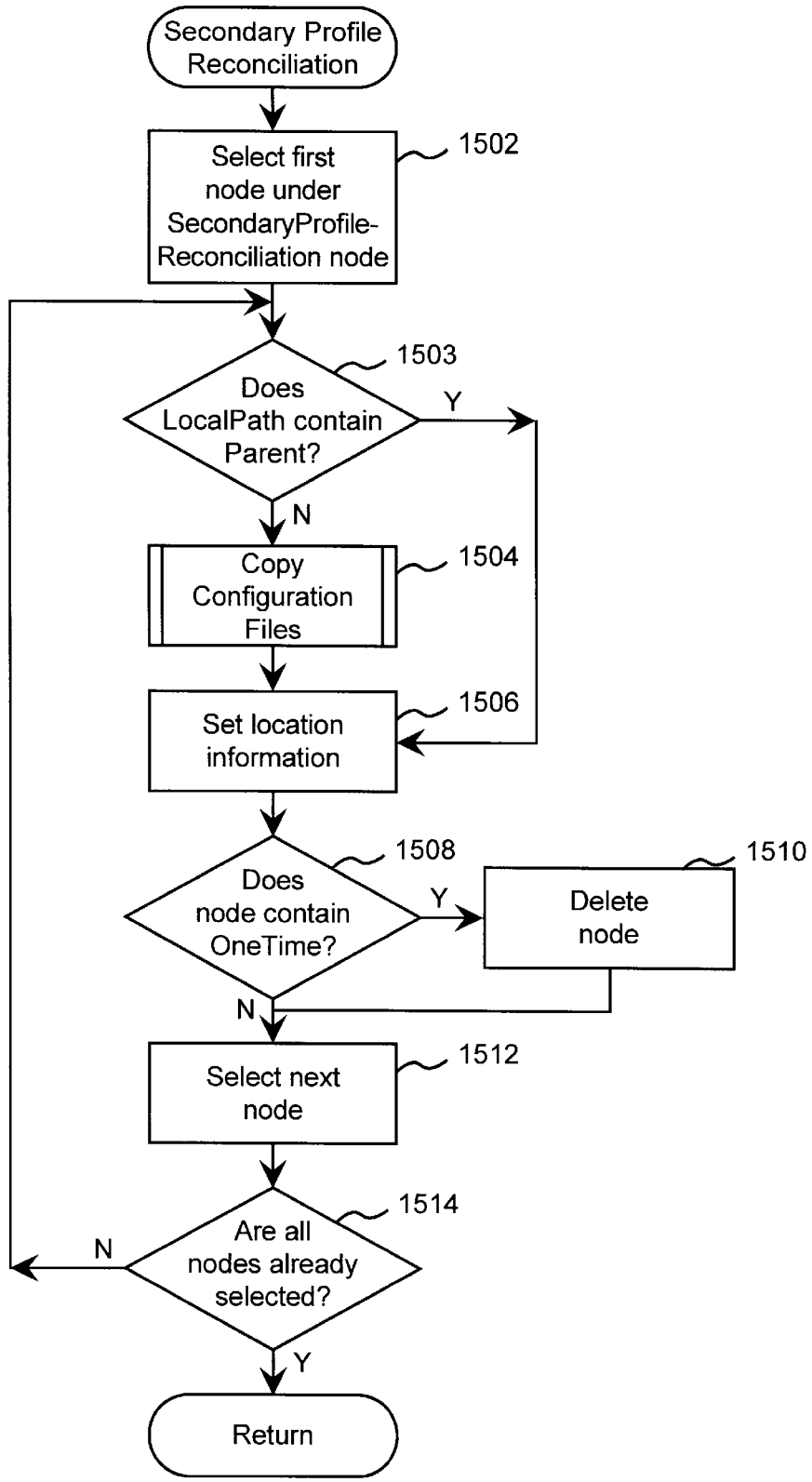
FIG. 15 illustrates a detailed flow diagram of the secondary profile reconciliation routine.

FIG. 15 illustrates a flow diagram of the secondary profile reconciliation routine. Secondary profile reconciliation is a process in which application configuration files in subfolders of the folders identified by a ProfileReconciliation node can be copied to the local subfolder. In addition, location information is stored in the registry for each subfolder processed during profile reconciliation. Secondary profile reconciliation is performed when the registry contains a SecondaryProfileReconciliation node for the current user. FIG. 5 illustrates a SecondaryProfileReconciliation node. The SecondaryProfileReconciliation node 540 contains nodes that are similar in format to the ProfileReconciliation node.

Each node contained in a SecondaryProfileReconciliation node contains several data entries. For example, the LocalPath data entry 543 contains the data entry value "Start\Programs." The CentralPath data entry 544 contains the data entry value "Programs." The FileNames data entry 545 contains the data entry value "*.lnk." The RegisterKey data entry 546 contains the data entry value "Software\Explorer\ShellFolders." The RegisterValue data entry 547 contains the data entry value "Programs." The Local Path and Central Path data entries identify folders that are typically subfolders of a folder identified in the ProfileReconciliation node.

Additionally, unlike with a ProfileReconciliation node, each node contained in a SecondaryProfileReconciliation node contains a data entry with a data entry name "Parent." The Parent data entry identifies a folder which is a "parent" folder for the folder identified by the LocalPath data entry. A "parent" folder is a folder which contains a subfolder. The subfolder is a "child" folder. For example, in FIG. 6, the folder "Start" 608 is a "parent" folder which contains the "child" folder "Programs" 614. The Parent data entry 548 contains the data entry value "StartMenu," which indicates that the folder identified by the StartMenu data entry in the node identified by the RegisterKey data entry was originally the "parent" folder of the folder "Programs" 614.

Figure 16:
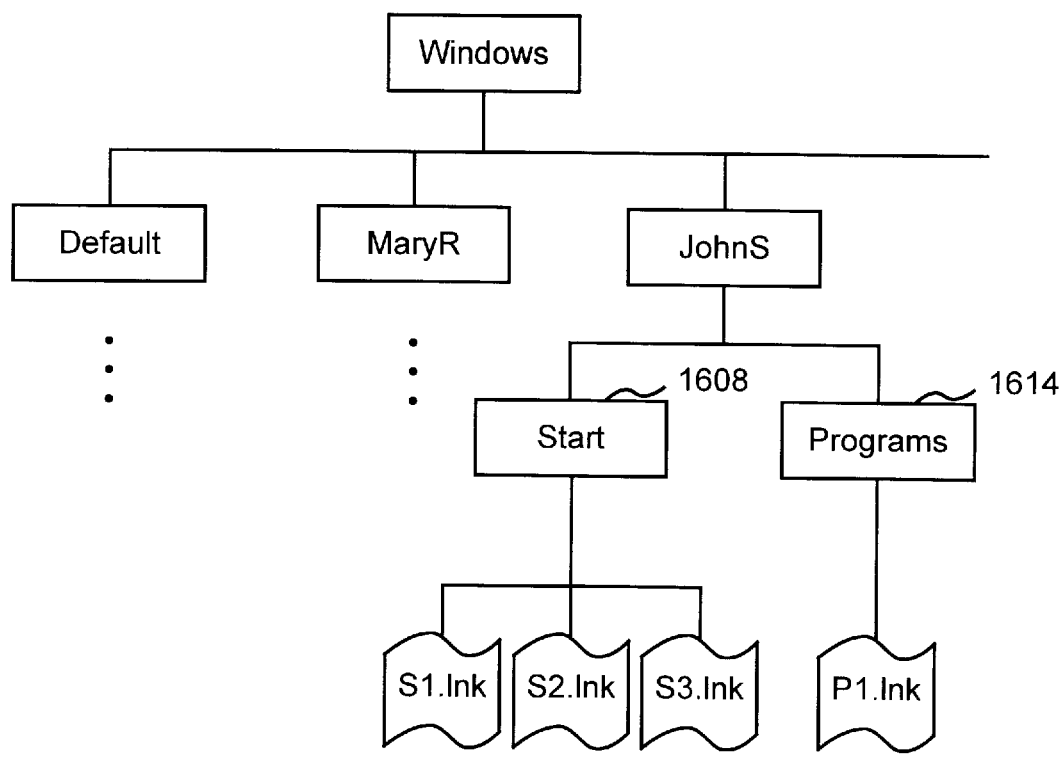
FIG. 16 illustrates the local file storage area after the folder "Programs" has been moved out of the folder "Start."

Typically, when profile reconciliation is performed on each node contained in a ProfileReconciliation node, all subfolders of identified folders also have their application configuration files that are identified by the FileNames data entry copied. To indicate that all application configuration files in all subfolders are to be copied, the ProfileReconciliation node contains a Subtree data entry. The purpose of secondary profile reconciliation is to add location information for the subfolders to the registry and to ensure that the application configuration files under a "child" folder are copied, even when the "child" folder has been moved out of the "parent" folder. For example, in FIG. 6, the folder "Programs" 608 is a "child" folder under the "parent" folder "Start" 614. FIG. 16 illustrates the local file storage area after the folder "Programs" has been moved out of the folder "Start." In FIG. 16, the folder "Programs" 1614 has been moved and is no longer a "child" folder of the folder "Start" 1608. Since the folder "Programs" 1614 is not a "child" folder of the folder "Start" 1608, when profile reconciliation is performed for the StartMenu node 527 the application configuration files in the folder "Programs" 1614 are not copied, even if the StartMenu node 527 contains a Subtree data entry.

Figure 17:
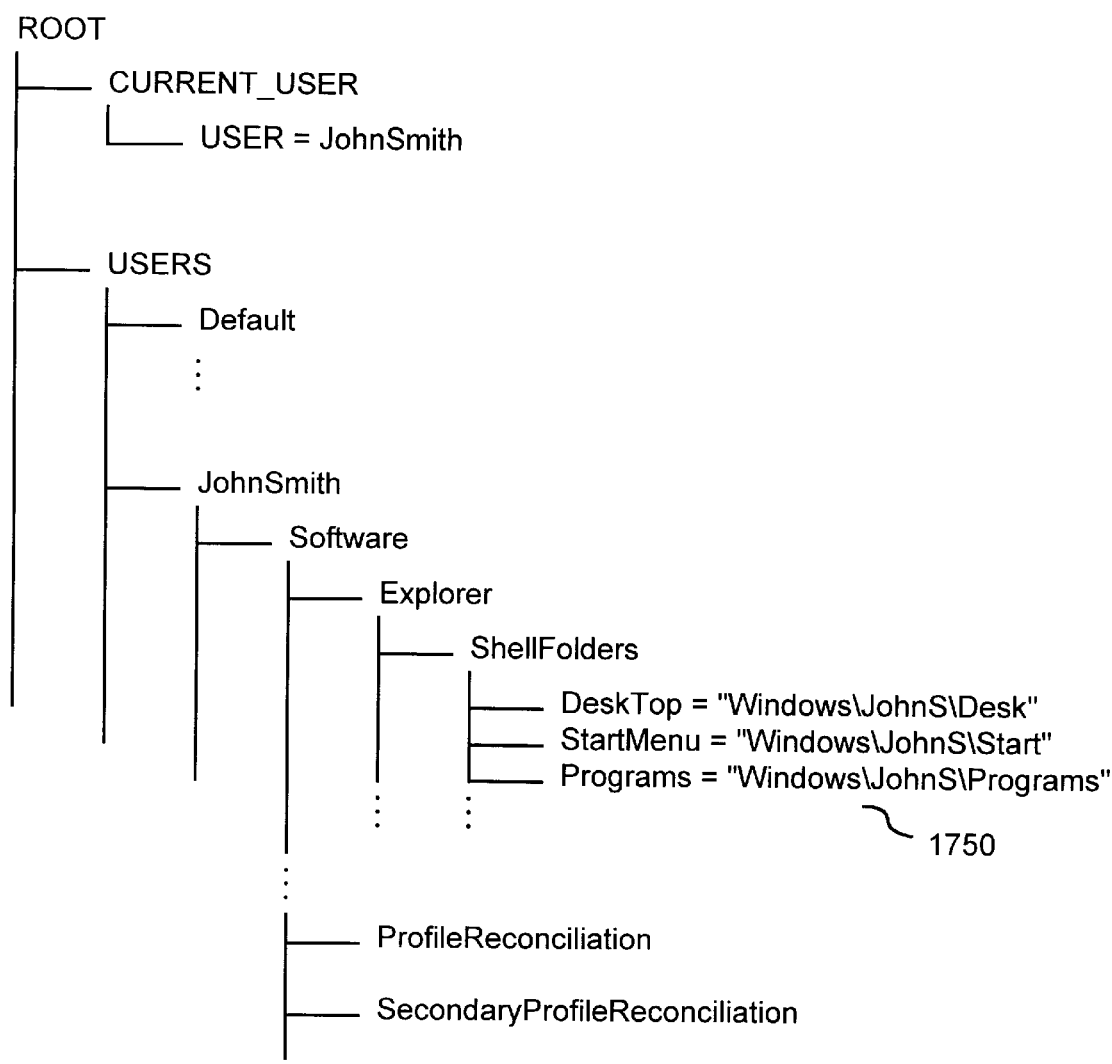
FIG. 17 illustrates the registry after the folder "Programs" was moved out of the folder "Start."

FIG. 17 illustrates the registry after the folder "Programs" was moved out of the folder "Start." Also, when a folder is moved, the system modifies the data entry value in the registry which provides a path name to that folder. For example, in FIG. 5, the Programs data entry 515 contains the data entry value "Windows\JohnS\Start\Programs." After the folder "Programs" 1614 was moved out of the folder "Start," the system updated the Programs data entry 1750 in the registry to contain the data entry value "Windows\JohnS\Programs."

The Programs node 541 indicates that the folder "Programs" was once a "child" folder of a folder identified by a node contained in the ProfileReconciliation node. When the folder "Programs" was moved, the Program data entry in the ShellFolders node was set to the new file path "Windows\JohnS\Programs."

A "child" folder has been moved out of the "parent" folder when the local path to the folder identified by the LocalPath data entry does not entirely contain the path name to the "parent" path. For example, in FIG. 5, the "child" folder is located at "Windows\JohnS\Programs" and the "parent" folder is located at "Windows\JohnS\Start." The local path is retrieved from the Programs data entry, identified by RegisterValue, from the ShellFolders node, identified by RegisterKey. The path name to the "parent" folder is retrieved from the StartMenu data entry, identified by the Parent data entry, in the ShellFolders node identified by the RegisterKey data entry. Since the local path does not entirely contain the path name to the "parent" folder, the identified application configuration files are copied to or deleted from the appropriate folders. Regardless of whether the local path entirely contains the path name to the "parent" folder, a data entry containing location information is updated in the registry. Again, the ShellFolders node is identified by the RegisterKey data entry and the Programs data entry is identified by the RegisterValue data entry. The local path to the folder "Programs" is copied to the data entry value of the Programs data entry 1750 contained in the ShellFolders node. Applications may access this data entry to obtain the location of their application configuration files.

Referring to FIG. 15, the secondary profile reconciliation routine is passed a SecondaryProfileReconciliation node and performs secondary profile reconciliation for each node contained in the passed node. In step 1502, the secondary profile reconciliation routine selects the first node contained in the SecondaryProfileReconciliation node. In step 1503, if the local path identified by the LocalPath data entry value entirely contains the path name of the "parent" folder identified by the Parent data entry value of the selected node, then the secondary profile reconciliation routine continues at step 1504, else the secondary profile reconciliation routine continues at step 1506. In step 1504, the secondary profile reconciliation routine copies the application configuration files to the identified folders. In step 1506, the secondary profile reconciliation routine sets a node in the registry to identify the local folder containing the application configuration files based on the RegisterKey and RegisterValue data entries in the selected mode. In step 1508, if the selected node contains the data entry OneTime, then the secondary profile reconciliation routine continues at step 1510, else it continues at step 1512. In step 1510, the secondary profile reconciliation routine deletes the selected node from the registry and continues at step 1512. In step 1512, the secondary profile reconciliation routine selects the next node contained in the SecondaryProfileReconciliation node. In step 1514, if all the nodes have already been selected, the secondary profile reconciliation routine returns, else it loops to step 1503.

While a user is using a computer system, the user may modify the configuration of the computer system. These modifications are typically stored in the application configuration files in the local folders. When a user logs off a computer system, the adding configuration files routine performs the profile reconciliation routine for each node contained in the Profile Reconciliation node. The adding configuration files routine also performs the secondary profile reconciliation routine for each node contained in the Secondary Profile Reconciliation node. In this way, the application configuration files in the central folders may be updated. The profile reconciliation and secondary profile reconciliation routines may modify data entries in the registry. Because the registry contains a link to the user profile file in the local home folder, the user profile file may also be modified. Therefore, to update the user profile file in the central home folder, the adding configuration files routine also copies the user profile file from the local home folder to the central home folder.

Although the present invention has been described in terms of the preferred embodiment, it is not intended that the invention be limited to this embodiment. Modification within the spirit of the invention will be apparent to those skilled in the art. For example, the present invention can be used to add configuration files other than application configuration files. In particular, the configuration files to be added may be system configuration files. In addition, the present invention can be used with a database other than a registry. In particular, the present invention can be used with a non database which is not organized in a hierarchy. Also, the present invention may be used with a registry which is not hierarchical. The scope of the present invention is defined by the claims which follow.

We claim:

1. A method in a computer system for providing configuration files for a user for configuration of a plurality of computer programs, the method comprising the steps of:

receiving an identification of the user; and for each of the plurality of computer programs, locating user profile information of the identified user for the computer program, the user profile information identifying configuration files, identifying a source folder that contains the configuration files, and identifying a destination folder in which to copy the configuration files;

deleting each configuration file that is currently in the identified destination folder; and copying each configuration file from the identified source folder to the identified destination folder so that the computer program can access the configuration files in the identified destination folder during configuration of the computer program whereby each computer program has its own identified configuration files, identified source folder, and identified destination folder.

2. A method in a computer system for reconciling configuration files for a user for use in configuring computer programs, the computer system having a registry with nodes, having a local folder containing configuration files, and a central folder containing configuration files, the method comprising the steps of:

retrieving a user profile file containing profile information that identifies configuration files, that identifies the local folder, and that identifies the central folder;

identifying configuration files, a source folder, and a destination folder from the profile information, the source folder and destination folder being identified from the local folder and the central folder; and repeating the following for each identified configuration file:

when the configuration file exists only in the source folder, copying the configuration file from the source folder to the destination folder;

when the configuration file exists only in the destination folder, deleting the configuration file;

when the configuration file exists in both the source and destination folders and the configuration file in the source folder is newer, copying the configuration file from the source folder to the destination folder;

when the configuration file exists in both the source and destination folders and the configuration file in the destination folder is newer, copying the configuration file from the destination folder to the source folder; and setting a node in the registry to indicate that the configuration files are stored in the local folder so that a computer program can identify from the set node the local folder that contains its reconciled configuration files.

3. The method of claim 2 wherein the step of retrieving a user profile file includes the following steps:

searching for a user profile file in a predetermined local folder and in a predetermined central folder;

when a user profile file is found in only the predetermined local folder or only the predetermined central folder, loading the found user profile file;

when a user profile file is found in both the predetermined local folder and the predetermined central folder, loading the more recently updated user profile file; and when a user profile file is not found, loading a default user profile file.

4. The method of claim 2 wherein the retrieved user profile file contains secondary file information that identifies a first file path, a second file path configuration files, a local folder, and a central folder, wherein, after setting a node in the registry to indicate the location of the configuration files in the local folder, repeating the following steps:

determining whether the identified first file path entirely contains the identified second file path;

when the identified first file path prefix does not entirely contain the identified second file path, copying appropriate configuration files from the configuration files identified in the secondary profile information from the central folder identified in the secondary profile information to the local folder identified in the secondary profile information; and setting a node in the registry to indicate that the configuration files identified in the secondary profile information are stored in the identified local folder so that a computer program can identify from the set node the local folder that contains its reconciled configuration file; and when the identified first file path does entirely contain the identified second file path, suppressing the copying of the configuration files identified in the secondary profile information.

5. The method of claim 2 wherein the step of setting a node in the registry to indicate the location to configuration files includes the step of receiving a location of the node in the registry and a location of the local folder from the retrieved profile information.

6. A method in a computer system for adding configuration files for an application program, the computer system having a registry with nodes, each node having data entries, the method comprising the steps of:

receiving a node containing data entries for a source folder name, for a destination folder name, for configuration file names, and for an identification of a node in the registry, and for a data entry name for the identified node;

copying configuration files having the received configuration file names to the named destination folder from the named source folder;

deleting configuration files that do not have the received configuration file names from the named destination folder; and storing in the identified node at the named data entry the destination folder name containing the configuration files so that the application program can locate the configuration files by accessing the named data entry in the identified node.

7. The method of claim 6 wherein the step of copying configuration files includes the step of adding configuration files to subfolders of the named destination folder from either the subfolders of the named source folder or a default folder when the received node contains a Subtree data entry.

8. The method of claim 6 including the step of deleting the received node when the received node contains a OneTime data entry.

9. A method in a computer system for configuring application programs in accordance with configurations that are customized to each of a plurality of users, the computer system having a registry with registry entries for storing information that is accessible by the application programs, the method comprising:

storing a user profile file for each of the users, each user profile file identifying, for each application program, application configuration files for use in configuring the application program, a destination folder and a source folder, and a registry entry of the registry;

receiving an identification of a user;

retrieving the stored user profile file for the identified user;

updating the destination folder identified in the retrieved user profile file with the application configuration files identified in the retrieved user profile file that are in the source folder identified in the retrieved user profile file;

updating the registry entry identified in the retrieved user profile file with an indication of the destination folder identified in the retrieved user profile file; and for each of the application programs,
retrieving the registry entry for the application program; and
executing the application program so that the application program is configured in accordance with the application configuration files in the destination folder indicated in the retrieved registry entry.

10. The method of claim 9 wherein when the source folder contains an application configuration file identified in the retrieved user profile file that is not also contained in the destination folder, copying the application configuration file from the source folder to the destination folder.

11. The method of claim 9 wherein when the destination folder contains an application configuration file identified in the retrieved user profile file that is not also contained in the source folder, deleting the application configuration file from the destination folder.

12. The method of claim 9 wherein when the destination folder and source folder both contain an application configuration file of the same name that is identified in the retrieved user profile file, copying that application configuration file that has been more recently updated to the other folder to replace the application configuration file that has been less recently updated.

13. The method of claim 9 wherein when the source folder contains an application configuration file identified in the retrieved user profile file that is not also contained in the destination folder, copying the application configuration file from the source folder to the destination folder;

wherein when the destination folder contains an application configuration file identified in the retrieved user profile file that is not also contained in the source folder, deleting the application configuration file from the destination folder; and wherein when the destination folder and source folder both contain an application configuration file of the same name that is identified in the retrieved user profile file, copying that application configuration file that has been more recently updated to the other folder to replace the application configuration file that has been less recently updated.

14. The method of claim 9 wherein the destination folder is a folder of the computer system and wherein the source folder is a folder of a central computer to which the computer system is connected.

15. A method in a computer system for configuring application programs in accordance with configurations that are customized to each of a plurality of users, the computer system being connected to a central computer, the method comprising:

storing a user profile for each of the users, each user profile identifying, for each application program, application configuration files for use in configuring the application program, a local folder of the computer system, and a source folder of the central computer;

receiving an identification of a user;

retrieving the stored user profile for the identified user;

updating the local folder identified in the retrieved user profile with the application configuration files identified in the retrieved user profile that are in the central folder identified in the retrieved user profile; and for each of the application programs, executing the application program so that the application program is configured in accordance with the application configuration files in the local folder that are customized for the identified user.

16. The method of claim 15 wherein the computer system includes a registry and the user profile identifies a registry entry of the registry and including updating the registry entry with an indication of the local folder so that the application configuration files can be located.

17. The method of claim 16 wherein the application program retrieves the identified registry entry to determine which folder contains the application configuration files.

18. The method of claim 15 wherein the updating further includes additionally updating subfolders of the local folder identified in the retrieved user profile with application configuration files identified in the retrieved user profile that are in a subfolder of the central folder identified in the retrieved user profile.

19. The method of claim 15 wherein the user profile further identifies a secondary central folder and a subfolder of the local folder, and when the secondary central folder is not a subfolder of the central folder, updating the subfolder of the local folder with application configuration files of the secondary central folder.

20. The method of claim 15 wherein when the local folder contains an application configuration file identified in the retrieved user profile that is not also contained in the central folder, deleting the application configuration file from the local folder.

21. The method of claim 15 wherein when the local folder and central folder both contain an application configuration file of the same name that is identified in the retrieved user profile, copying that application configuration file that has been more recently updated to the other folder to replace the application configuration file that has been less recently updated.

22. The method of claim 15 wherein when the central folder contains an application configuration file identified in the retrieved user profile that is not also contained in the local folder, copying the application configuration file from the central folder to the local folder;

wherein when the local folder contains an application configuration file identified in the retrieved user profile that is not also contained in the central folder, deleting the application configuration file from the local folder; and wherein when the local folder and central folder both contain an application configuration file of the same name that is identified in the retrieved user profile, copying that application configuration file that has been more recently updated to the other folder to replace the application configuration file that has been less recently updated.

23. A method for reconciling application configuration information between a central computer system and a local computer system, the method comprising:

storing a user profile for each of the users, each user profile identifying, for each application program, application configuration files for use in configuring the application program, a local folder of the computer system, and a source folder of the central computer;

receiving an identification of a user;

retrieving the stored user profile for the identified user;

when the central folder contains an application configuration file identified in the retrieved user profile that is not also contained in the local folder, copying the application configuration file from the central folder to the local folder;

when the local folder contains an application configuration file identified in the retrieved user profile that is not also contained in the central folder, deleting the application configuration file from the local folder; and when the local folder and central folder both contain an application configuration file of the same name that is identified in the retrieved user profile, copying that application configuration file that has been more recently updated to the other folder to replace the application configuration file that has been less recently updated.

24. A computer-readable medium containing instructions for causing a computer system to reconcile application configuration files that are customized to each of a plurality of users, the computer system having a registry with registry entries for storing information that is accessible by application programs, by:

storing a user profile for each of the users, each user profile identifying, for each application program, application configuration files for use in configuring the application programs, a destination folder and a source folder, and a registry entry of the registry;

receiving an identification of a user;

retrieving the stored user profile for the identified user;

updating the destination folder identified in the retrieved user profile with the application configuration files identified in the retrieved user profile that are in the source folder identified in the retrieved user profile; and updating the registry entry identified in the retrieved user profile with an indication of the destination folder identified in the retrieved user profile so that, when executing the application program, the application program is configured in accordance with the application configuration files in the destination folder indicated in the registry entry for the application program.

25. The computer-readable medium of claim 24 wherein when the source folder contains an application configuration file identified in the retrieved user profile that is not also contained in the destination folder, copying the application configuration file from the source folder to the destination folder.

26. The computer-readable medium of claim 24 wherein when the destination folder contains an application configuration file identified in the retrieved user profile that is not also contained in the source folder, deleting the application configuration file from the destination folder.

27. The computer-readable medium of claim 24 wherein when the destination folder and source folder both contain an application configuration file of the same name that is identified in the retrieved user profile, copying that application configuration file that has been more recently updated to the other folder to replace the application configuration file that has been less recently updated.

28. The computer-readable medium of claim 24 wherein when the source folder contains an application configuration file identified in the retrieved user profile that is not also contained in the destination folder, copying the application configuration file from the source folder to the destination folder;

wherein when the destination folder contains an application configuration file identified in the retrieved user profile that is not also contained in the source folder, deleting the application configuration file from the destination folder; and wherein when the destination folder and source folder both contain an application configuration file of the same name that is identified in the retrieved user profile, copying that application configuration file that has been more recently updated to the other folder to replace the application configuration file that has been less recently updated.

29. The computer-readable medium of claim 24 wherein the destination folder is a folder of the computer system and wherein the source folder is a folder of a central computer to which the computer system is connected.

30. A computer-readable medium containing instructions for causing the reconciliation of application configuration information between a central computer system and a local computer system, by:

storing a user profile for each of the users, each user profile identifying, for each application program, application configuration files for use in configuring the application program, a local folder of the computer system, and a source folder of the central computer;

receiving an identification of a user;

retrieving the stored user profile for the identified user;

when the central folder contains an application configuration file identified in the retrieved user profile that is not also contained in the local folder, copying the application configuration file from the central folder to the local folder; and when the local folder and central folder both contain an application configuration file of the same name that is identified in the retrieved user profile, copying that application configuration file that has been more recently updated to the other folder to replace the application configuration file that has been less recently updated.

* * * * *